United States Patent
Verma et al.

(10) Patent No.: US 9,558,718 B2
(45) Date of Patent: Jan. 31, 2017

(54) STREAMING VIDEO DATA IN THE GRAPHICS DOMAIN

(71) Applicant: QUALCOMM Incorporated, San Diego, CA (US)

(72) Inventors: Lochan Verma, San Diego, CA (US); Vijayalakshmi Rajasundaram Raveendran, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 154 days.

(21) Appl. No.: 14/530,338

(22) Filed: Oct. 31, 2014

(65) Prior Publication Data
US 2016/0063964 A1    Mar. 3, 2016

Related U.S. Application Data

(60) Provisional application No. 62/045,421, filed on Sep. 3, 2014.

(51) Int. Cl.
*G09G 5/00* (2006.01)
*G09G 5/36* (2006.01)
(Continued)

(52) U.S. Cl.
CPC ............. *G09G 5/363* (2013.01); *G06F 3/14* (2013.01); *G06T 1/20* (2013.01); *G06T 11/001* (2013.01);
(Continued)

(58) Field of Classification Search
None
See application file for complete search history.

(56) References Cited

U.S. PATENT DOCUMENTS

2005/0237330 A1   10/2005   Stauffer et al.
2011/0107388 A1   5/2011    Lee et al.
(Continued)

FOREIGN PATENT DOCUMENTS

EP    2890080 A1      7/2015
WO    2012106644 A1   8/2012

OTHER PUBLICATIONS

"Universal Serial Bus Device Class Definition for Audio/Video Devices," AV Device Class Overview & AVFunction Definition, Release 1.0, Dec. 7, 2011, 180 pp.
(Continued)

*Primary Examiner* — Xiao Wu
*Assistant Examiner* — Mohammad H Akhavannik
(74) *Attorney, Agent, or Firm* — Shumaker & Sieffert, P.A.

(57) ABSTRACT

In one example, a method for transmitting video data includes capturing, by a source device, a plurality of tokens of graphical commands renderable into video data along with one or more texture elements; and generating, by the source device, a plurality of command frames that each correspond to at least one token of the plurality of tokens. In this example, each respective command frame of the plurality of command frames includes: an identification of at least one graphical command corresponding to the at least one token, and one or more arguments associated with the at least one token. In this example, the method also includes outputting, by the source device and for transmission to a sink device, the plurality of command frames.

30 Claims, 10 Drawing Sheets

(51) Int. Cl.
*G06F 3/14* (2006.01)
*G06T 11/00* (2006.01)
*G06T 1/20* (2006.01)
*H04N 21/4363* (2011.01)
*H04N 21/845* (2011.01)
*H04L 29/06* (2006.01)
*H04N 21/61* (2011.01)
*H04N 21/6437* (2011.01)

(52) U.S. Cl.
CPC ............ *G09G 5/001* (2013.01); *H04L 65/607* (2013.01); *H04N 21/43637* (2013.01); *H04N 21/6175* (2013.01); *H04N 21/6437* (2013.01); *H04N 21/8455* (2013.01); *G09G 2370/16* (2013.01)

(56) References Cited

U.S. PATENT DOCUMENTS

2013/0179605 A1    7/2013  Huang et al.
2015/0179130 A1*   6/2015  Smadi .................. G09G 5/006
                                              345/520

OTHER PUBLICATIONS

"High-bandwidth Digital Content Protection System," Interface Independent Adaptation, Revision 2.2, Oct. 16, 2012, 78 pp.
"Wi-Fi Display Technical Specification," Draft Version 1.47, Wi-Fi Alliance Proprietary, Aug. 2012, 176 pp.
"OpenGL 4.5 API Reference Card," Khronos Group, Aug. 2014, retrieved from www.opengl.org/registry, 13 pp.
"EGL 1.4 API Quick Reference Card," Khronos Group, Jun. 2011, retrieved from www.khronos.org/egl, 2 pp.
International Search Report and Written Opinion from International Application No. PCT/US2015/045721, dated Mar. 14, 2016, 16 pp.
Lagar-Cavilla H.A., et al., "VMM-Independent Graphics Acceleration," ACM, 2 Penn Plaza, Suite 701—New York USA, Jun. 15, 2007, XP040062077, pp. 33-43.
Lamboray, et al., "Interactive Multimedia Streams in Distributed Applications," Computers and Graphics, Elsevier, GB, Oct. 2003, vol. 27, No. 5, pp. 735-745, XP004465055.
"Wi-Fi Peer-to-Peer Services (P2Ps) Technical Specification (for Wi-Fi Direct services certification)," Aug. 21, 2014 , pp. 1-100, XP055235113, Retrieved from the Internet: URL:https://www.wi-fi.org/discover-wi-fi/specifications.
Second Written Opinion from International Application No. PCT/US2015/045721, dated Sep. 6, 2016, 10 pp.
Response to Written Opinion dated Mar. 14, 2016, from International Application No. PCT/US2015/045721, filed on Jul. 1, 2016, 7 pp.
Response to Written Opinion dated Sep. 6, 2016, from International Application No. PCT/US2015/045721, filed on Nov. 4, 2016, 8 pp.
International Preliminary Report on Patentability from International Application No. PCT/US2015/045721, dated Dec. 1, 2016, 10 pp.

* cited by examiner

STREAMING VIDEO DATA IN THE GRAPHICS DOMAIN

This application claims the benefit of U.S. Provisional Application No. 62/045,421, filed Sep. 3, 2014 the entire content of which is incorporated by reference herein.

TECHNICAL FIELD

This disclosure relates to techniques for streaming video from a source device to a sink device.

BACKGROUND

Remote display (RD) systems include a source device and one or more sink devices. The source device and each of the sink devices may be either mobile devices or wired devices with wired and/or wireless communication capabilities. As mobile devices, for example, one or more of the source device and the sink devices may comprise mobile telephones, vehicle infotainment systems, tablet computers, laptop computers, portable computers with wireless communication cards, personal digital assistants (PDAs), wireless gaming devices, portable media players, or other flash memory devices with wireless communication capabilities. Mobile devices may also include so-called "smart" phones and "smart" pads or tablets, or other types of wireless communication devices. As wired devices, for example, one or more of the source device and the sink devices may comprise televisions, desktop computers, monitors, projectors, and the like, that include wireless communication capabilities.

The source device sends media data, such as audio and/or video data, to one or more of the sink devices participating in a particular communication session. The media data may be played back at both a local display of the source device and at each of the displays of the sink devices. More specifically, each of the participating sink devices renders the received media data on its display and audio equipment.

The Wi-Fi Display (WFD) standard (also known as Miracast™) is an emerging standard for wireless display systems being developed by the Wi-Fi Alliance and based on Wi-Fi Direct. The WFD standard provides an interoperable mechanism to discover, pair, connect, and render media data sourced from a Wi-Fi Display Source at a Wi-Fi Display Sink.

SUMMARY

In general, this disclosure describes techniques for transmitting video data from a source device to a sink device in the graphics domain.

In one example, a method for transmitting video data includes capturing, by a source device, a plurality of tokens of graphical commands renderable into video data along with one or more texture elements; generating, by the source device, a plurality of command frames that each correspond to at least one token of the plurality of tokens, wherein each respective command frame of the plurality of command frames includes: an identification of at least one graphical command corresponding to the at least one token; and one or more arguments associated with the at least one token; and outputting, by the source device and for transmission to a sink device, the plurality of command frames.

In another example, a source device includes a memory; a communications unit; and one or more processors configured to: capture a plurality of tokens of graphical commands renderable into video data along with one or more texture elements; generate a plurality of command frames that each correspond to at least one token of the plurality of tokens, wherein each respective command frame of the plurality of command frames includes: an identification of at least one graphical command corresponding to the at least one token; and one or more arguments associated with the at least one token; and output, to the communications unit and for transmission to a sink device, the plurality of command frames.

In another example, a source device includes means for capturing a plurality of tokens of graphical commands renderable into video data along with one or more texture elements; means for generating a plurality of command frames that each correspond to at least one token of the plurality of tokens, wherein each respective command frame of the plurality of command frames includes: an identification of at least one graphical command corresponding to the at least one token; and one or more arguments associated with the at least one token; and means for outputting, for transmission to a sink device, the plurality of command frames.

In another example, a non-transitory computer-readable storage medium stores instructions that, when executed, cause one or more processors of a source device to: capture a plurality of tokens of graphical commands renderable into video data along with one or more texture elements; generate a plurality of command frames that each correspond to at least one token of the plurality of tokens, wherein each respective command frame of the plurality of command frames includes: an identification of at least one graphical command corresponding to the at least one token; and one or more arguments associated with the at least one token; and output, for transmission to a sink device, the plurality of command frames.

In another example, a method for receiving video data includes receiving, by a sink device and from a source device, a plurality of command frames that each correspond to at least one token of a plurality of tokens, wherein each respective command frame of the plurality of command frames includes: an identification of at least one graphical command corresponding to the at least one token; and one or more arguments associated with the at least one token; reconstructing, by the sink device, the plurality of tokens based on the plurality of command frames; and rendering, by the sink device, video data based on the plurality of tokens and one or more texture elements.

In another example, a sink device includes a memory; a communications module; and one or more processors configured to: receive, from a source device and via the communications module, a plurality of command frames that each correspond to at least one token of a plurality of tokens, wherein each respective command frame of the plurality of command frames includes: an identification of at least one graphical command corresponding to the at least one token; and one or more arguments associated with the at least one token; reconstruct the plurality of tokens based on the plurality of command frames; and render video data based on the plurality of tokens and one or more texture elements.

In another example, a sink device includes means for receiving, from a source device, a plurality of command frames that each correspond to at least one token of a plurality of tokens, wherein each respective command frame of the plurality of command frames includes: an identification of at least one graphical command corresponding to the at least one token; and one or more arguments associated with the at least one token; means for reconstructing the plurality of tokens based on the plurality of command frames; and means for rendering video data based on the plurality of tokens and one or more texture elements.

In another example, a non-transitory computer-readable storage medium stores instructions that, when executed, cause one or more processors of a sink device to receive, from a source device, a plurality of command frames that each correspond to at least one token of a plurality of tokens, wherein each respective command frame of the plurality of command frames includes: an identification of at least one graphical command corresponding to the at least one token; and one or more arguments associated with the at least one token; reconstruct the plurality of tokens based on the plurality of command frames; and render video data based on the plurality of tokens and one or more texture elements.

The details of one or more examples are set forth in the accompanying drawings and the description below. Other features, objects, and advantages will be apparent from the description and drawings, and from the claims.

DETAILED DESCRIPTION

This disclosure describes techniques for outputting video from a source device to a sink device. In some examples, a source device may output video to a sink device by capturing constructed frames from a frame buffer of the source device, and transmitting the captured frames to the sink device, which may then displaying the images at a display of the sink device. This method may be referred to as a "pixel domain" transmission method. However, in some examples, it may not be desirable to use the pixel domain method, such as when outputting video that includes computer generated graphical content, because the pixel domain method may introduce compression artifacts that may eliminate high frequencies and/or blur edges.

Alternatively, in some examples, a "graphics domain" transmission method may be used by a source device to output deconstructed video frames to a sink device. Graphics domain transmission may be accomplished by capturing display data at an input of a GPU of the source device in the form of graphics commands (e.g., OpenGL commands) and texture elements, transmitting the commands and texture elements to the sink device. A GPU of the sink device may render the commands and texture elements into displayable frames, and output the rendered frames at the display of the sink device.

In some examples, it may be desirable to utilize the graphics domain transmission method in conjunction with one or more wireless display standards. For instance, it may be desirable to utilize the graphics domain transmission method to stream video data within the Miracast™ wireless display standard when one or more sink devices support graphics domain processing.

In accordance with one or more techniques of this disclosure, a Miracast™ standard compliant sink device and source device may be modified to stream video data using the graphics domain transmission method. For instance, a source device may generate specialized command frames based on graphical commands and texture elements at the source device and transmit the command frames to a sink device. The sink device may reconstruct the graphical commands and texture elements, and use the reconstructed graphical commands and texture elements to render video data.

Figure 1:
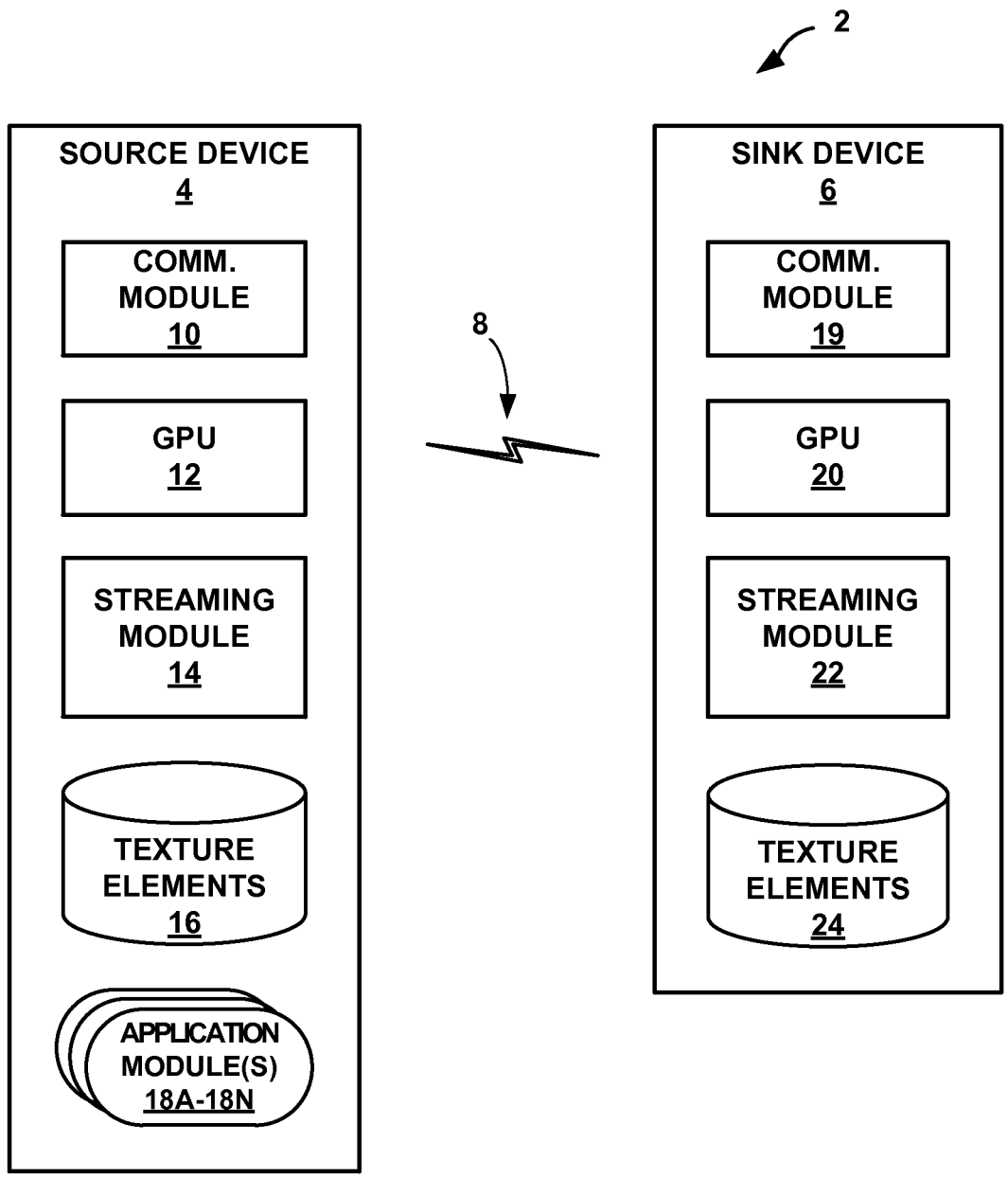
FIG. 1 is a conceptual diagram of an example remote display (RD) system in which a source device is configured to output video to a sink device over a wireless communication channel, in accordance with one or more techniques of this disclosure.

FIG. 1 is a conceptual diagram of an example remote display (RD) system in which a source device is configured to output video to a sink device over a communication channel, in accordance with one or more techniques of this disclosure. As illustrated in FIG. 1, WD system 2 includes source device 4, sink device 6, and communication channel 8.

Communication channel 8 may be any channel capable of propagating communicative signals between source device 4 and sink device 6. In some examples, communication channel 8 may be a wireless communication channel. For instance, communication channel 8 may be implemented in radio frequency communications in frequency bands such as the 2.4 gigahertz (GHz) band, the 5 GHz band, the 60 GHz band, or other frequency bands. In some examples, communication channel 8 may comply with one or more sets of standards, protocols, or technologies such as universal serial bus (USB) (as promoted by the USB Implementers Forum), Wi-Fi (as promoted by the Wi-Fi Alliance), WiGig (as promoted by the Wireless Gigabit Alliance), and/or the Institute of Electrical and Electronics Engineers (IEEE) 802.11 set of standards (e.g., 802.11, 802.11a, 802.11b, 802.11g, 802.11n, 802.11ac, 802.11ad, etc.), or other standards, protocols, or technologies. The frequency bands used, such as the 2.4 GHz, 5 GHz, and 60 GHz bands, may be defined for purposes of this disclosure as they are understood in light of the standards of Wi-Fi, WiGig, any one or more IEEE 802.11 protocols, or other applicable standards or protocols.

WD 2 may include source device 4 which may be configured to stream video data in the form of texture elements and graphical commands to a sink device over a wireless communication channel. For instance, source device 4 may stream command frames to sink device 6 over communication channel 8. Examples of source device 4 may include, but are not limited to mobile devices such as smartphones or other mobile handsets, tablet computers, laptop computers, desktop computers, wearable computing devices (e.g., smart watches, visors, and the like), one or more processing units or other integrated circuits or chip sets, or other electronic devices. As illustrated in the example of FIG. 1, source device 4 may include communication module 10, graphics processing unit (GPU) 12, streaming module 14, texture elements 16, and application modules 18A-18N.

Source device 4 may include communication module 10 which may manage communications between source device 4 and one or more external devices, such as sink device 6. For instance, communication module 10 may exchange data with sink device 6 over communication channel 8. As one example, communication module 10 may stream texture elements and graphical commands to sink device 6 over a wireless communication channel, such as by using a direct Wi-Fi connection. As another example, communication module 10 may stream texture elements and graphical commands to sink device 6 over a wired communication channel, such as by using a USB connection. In some examples, communication module 10 may receive information to be transmitted from other components of source device 4. For example, communication module 10 may receive command frames from streaming module 14.

Source device 4 may include GPU 12 which may render frames of video data based on one or more texture elements and graphical commands. Some examples of graphical commands which may be performed by GPU 12 include, but are not limited to, the DirectX® API by Microsoft®, the OpenGL® API by the Khronos group, and the OpenCL™ API. In some examples, GPU 12 may render frames of video data based on graphical commands and texture elements associated with one or more of application modules 18. For instance, GPU 12 may render frames of video data based on graphical commands and texture elements associated with an application module of application modules 18 for output at a display operatively coupled to or included in source device 4.

Source device 4 may include streaming module 14 which may be configured to stream video data to one or more external devices. For instance, streaming module 14 may stream video data in the form of graphical commands and texture elements to sink device 6. In some examples, streaming module 14 may capture the graphical commands and/or texture elements 16 at an input of GPU 12. In some examples, streaming module 14 may stream video data by encapsulating the captured graphical commands and/or texture elements in a plurality of command frames.

Source device 4 may include application modules 18 which may each represent an application provided by an entity that manufactures source device 4 or software operating on source device 4 or an application developed by a third-party for use with source device 4. Examples of application modules 18 may include applications for gaming, shopping, travel routing, maps, audio and/or video presentation, word processing, spreadsheets, voice and/or calls, weather, etc.

Source device 4 may include texture elements 16 which may be utilized by a GPU to render frames of video data. In some examples, one or more of texture elements 16 may be associated with a particular application module of application modules 18. For instance, where a gaming application of application modules 18, such as Fruit Ninja, entails the slicing of falling fruit (e.g., watermelons, avocados, pineapples, other fruit) or other falling elements, example texture elements of texture elements 16 that may be associated with the gaming application include a graphical representation of each of the types of fruit. In some examples, texture elements 16 may be stored in a plurality of formats. Some example formats include, but are not limited to, RGBα 8888, RGBα 4444, RGBα 5551, RGB 565, Yα 88, and α 8.

WD 2 may include sink device 6 which may be configured to receive video data in the form of texture elements and graphical commands from a source device over a wireless communication channel. For instance, sink device 6 may receive texture elements 24 from source device 4 over communication channel 8. Examples of sink device 6 may include, but are not limited to mobile devices such as smartphones or other mobile handsets, tablet computers, laptop computers, desktop computers, wearable computing devices (e.g., smart watches, visors, and the like), televisions, monitors, one or more processing units or other integrated circuits or chip sets, or other electronic devices. As illustrated in the example of FIG. 1, sink device 6 may include communication module 19, graphics processing unit (GPU) 20, streaming module 22, and texture elements 24.

Sink device 6 may include communication module 19 which may manage communications between sink device 6 and one or more external devices, such as source device 4. In some example, communication module 19 may perform operations similar to communication module 10 of source device 4. For instance, communication module 19 may exchange data with source device 4 over communication channel 8. As one example, communication module 19 may receive graphical commands and texture elements from source device 4 over a direct Wi-Fi connection. In some examples, communication module 19 may provide received information to other components of sink device 6. For example, communication module 19 may provide received graphical commands and texture elements to streaming module 22.

Sink device 6 may include GPU 20 which may perform operations similar to GPU 12 of source device 4. For instance, GPU 20 may render frames of video data based on one or more texture elements and graphical commands. In some examples, GPU 20 may be capable of performing the same graphical commands as GPU 12. Some examples of graphical commands which may be performed by GPU 20 include, but are not limited to, the DirectX® API by Microsoft®, the OpenGL® API by the Khronos group, and the OpenCL™ API. In some examples, GPU 20 may render frames of video data based on graphical commands and texture elements received from one or more other components of sink device 6, such as streaming module 22. For instance, GPU 20 may render frames of video data based on graphical commands and texture elements associated received from streaming module 22 for output at a display operatively coupled to or included in sink device 4.

Sink device 6 may include streaming module 22 which may be configured to receive streaming video data from one or more external devices. For instance, streaming module 22 may receive streaming video data in the form of graphical commands and texture elements from source device 4. In some examples, the graphical commands and/or the texture elements received by streaming module 22 may be encoded in a plurality of command frames. In such examples, streaming module 22 may be configured to process the plurality of command frames to decode the graphical commands and/or the texture elements.

Sink device 6 may include texture elements 24 which may be utilized by a GPU to render frames of video data. For instance, GPU 20 may utilize texture elements 24 to render frames of video data.

A user of source device 4 may desire to stream video from source device 4 to sink device 6. For instance, where a size of a display of source device 4 is smaller than a size of a display of sink device 6, the user of source device 4 may desire to utilize the larger display of sink device 6 to output the video. However, it may not be desirable to transmit constructed frames of video data from source device 4 to sink device 6, e.g., due to bandwidth restrictions, processing power, and the like. In accordance with one or more techniques of this disclosure, streaming module 14 source device 4 may output graphical commands and one or more texture elements to streaming module 22 of sink device 6 via communication channel 8 in order to cause GPU 20 of sink device 6 to render frames of video data. In this way, as opposed to streaming video data in the pixel domain, source device 4 may stream video data to sink device 6 in the graphics domain, e.g., by streaming graphical commands and texture elements.

In operation, streaming module 14 may capture a plurality of graphical commands and one or more texture elements. For instance, streaming module 14 may capture a plurality of graphical commands generated by one or more of application modules 18 at an input of GPU 12.

In accordance with one or more techniques of this disclosure, streaming module 14 may encode the plurality of graphical commands in a plurality of command frames. For instance, streaming module 14 may generate a plurality of command frames that each correspond to at least one graphical command of the plurality of graphical commands. Further details of an example command frame are provided below with reference to FIG. 3.

In some examples, one or more of the graphical commands may include one or more arguments, which may either be data or pointers that reference data. As such, responsive to determining that at least one argument of the one or more arguments included in a graphical command of a particular command frame includes a pointer that references data, streaming module 14 may dereference the pointer such that the particular command frame includes the data in the graphical command. In this way, streaming module 14 may enable sink device 6 to execute the graphical command without attempting to reference data stored on source device 4.

In any case, streaming module 14 may output the plurality of command frames to sink device 6. For instance, streaming module 14 may output the plurality of command frames to communication module 10 which may transmit the plurality of command frames to communication module 10 of sink device 6 over communication channel 8, such as by using a direct Wi-Fi connection.

Sink device 6 may render one or more video frames based on the received plurality of command frames. For instance, communication module 19 may provide the plurality of command frames to streaming module 22, which may decode the plurality of command frames to reconstruct the plurality of graphical commands and/or the one or more texture elements. Streaming module 22 may provide the reconstructed plurality of graphical commands and/or the one or more texture elements to GPU 20, which may render the one or more video frames.

Figure 2:
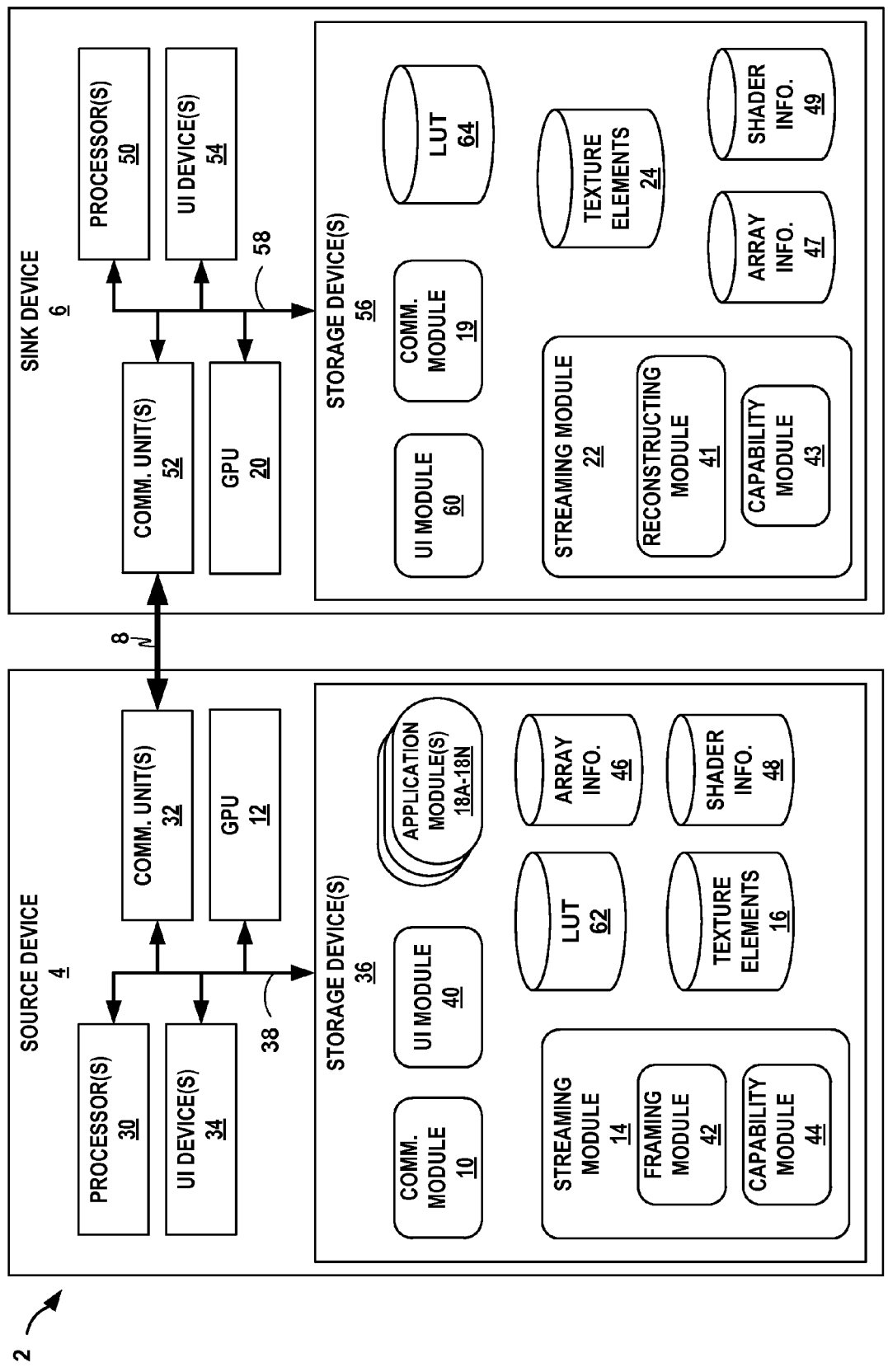
FIG. 2 is a block diagram illustrating further details of one example of source device 4 and sink device 6 of FIG. 1 in which source device 4 is configured to output video to sink device 6 over wireless communication channel 8, in accordance with one or more techniques of the present disclosure.

FIG. 2 is a block diagram illustrating further details of one example of source device 4 and sink device 6 of FIG. 1 in which source device 4 is configured to stream video to sink device 6 over communication channel 8, in accordance with one or more techniques of the present disclosure.

As illustrated in FIG. 2, source device 4 may include one or more processors 30, one or more communication units 32, one or more user interface (UI) devices 34, and one or more storage devices 36. Each of components 30, 32, 34, and 36 may be interconnected (physically, communicatively, and/or operatively) via communication channels 38 for inter-component communications. In some examples, communication channels 38 may include a system bus, network connection, interprocess communication data structure, or any other channel for communicating data. One or more of storage devices 36, in some examples, may include communication module 10, streaming module 14, texture elements 16, array information 46, shader information 48, one or more application modules 18A-18N (collectively, "application modules 18"), and UI module 40.

Processors 30, in one example, are configured to implement functionality and/or process instructions for execution within source device 4. For example, processors 30 may be capable of processing instructions stored in one or more of storage devices 36. Examples of processors 30 may include any one or more microprocessors, digital signal processors (DSPs), application specific integrated circuits (ASICs), field programmable gate arrays (FPGAs), or any other equivalent integrated or discrete logic circuitry, as well as any combinations of such components.

Source device 4, in some examples, also includes ones or more communication units 32. Source device 4, in one example, utilizes one or more of communication units 32 to communicate with external devices via one or more networks, such as one or more wireless networks. One or more of communication units 32 may be a network interface card, such as an Ethernet card, an optical transceiver, a radio frequency transceiver, or any other type of device that can send and receive information. Other examples of such network interfaces may include Bluetooth, 3G, and Wi-Fi radios. In some examples, source device 4 utilizes communication unit 32 to wirelessly communicate with an external device. For instance, source device 4 may utilize communication unit 32 to wirelessly communicate with communication unit 52 of sink device 6 over communication channel 8. In some examples, communication unit 32 may receive input from other components of source device 4, such as communication module 10, which causes communication unit 32 to wirelessly communicate with an external device.

Source device 4, in some examples, may also include one or more UI devices 34. In some examples, one or more of UI devices 34 can be configured to output content, such as video data. For instance, a display of UI devices 34 may be configured to display frames of video data rendered by GPU 12. In addition to outputting content, one or more of UI devices 34 may be configured to receive tactile, audio, or visual input. Some examples of UI devices 34 include video displays, speakers, keyboards, touch screens, mice, cameras, and the like.

Source device 4, in some examples, may also include UI module 40. UI module 40 can perform one or more functions to receive, content, such as UI data from other components associated with source device 4 and cause one or more of UI devices 34 to output the content. In some examples, UI module 40 may be configured to receive an indication of input, such as user input, and send the indications of the input to other components associated with source device 4, such as streaming module 14.

One or more storage devices 36 may be configured to store information within source device 4 during operation. One or more of storage devices 36, in some examples, may comprise a computer-readable storage medium. In some examples, one or more of storage devices 36 may comprise a temporary memory, meaning that a primary purpose of one or more of storage devices 36 is not long-term storage. One or more of storage devices 36, in some examples, may comprise a volatile memory, meaning that one or more of storage devices 36 does not maintain stored contents when the system is turned off. Example of volatile memories include random access memories (RAM), dynamic random access memories (DRAM), static random access memories (SRAM), and other forms of volatile memories known in the art. In some examples, one or more of storage devices 36 is used to store program instructions for execution by processors 30. One or more of storage devices 36, in one example, may be used by software or modules running on source device 4 (e.g., communication module 10, streaming module 14, application modules 18, and UI module 40) to temporarily store information during program execution.

One or more of storage devices 36, in some examples, may also include one or more computer-readable storage media. One or more of storage devices 36 may further be configured for long-term storage of information. In some examples, one or more of storage devices 36 may include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Source device 4, in some examples, may also include look-up-table (LUT) 62. LUT 62 may store a list of graphical commands along with information about the graphical commands. For instance, for each graphical command, LUT 62 may store a mapping from a token identifier (such as token ID 84 of FIG. 3) to a respective graphical command. In some examples, LUT 62 may store an indication of which arguments the respective graphical commands takes as input. In some examples, LUT 62 may store an indication a length of each of the arguments the respective graphical commands takes as input. An example entry in LUT 62 is shown below in Table (1). In some examples, source device 4 may include a separate LUT for each set of graphical commands. For instance, source device 4 may include a first LUT for OpenGL commands and a second LUT for EGL commands. In some examples, a single LUT may include entries for both OpenGL and EGL commands.

TABLE (1)

| Token ID | Function | Arg 1 | Arg 2 | Sizeof (Arg 1) | Sizeof (Arg 2) |
|---|---|---|---|---|---|
| T | funcX | 10 | pointer | 1 byte | 96 bytes |

As illustrated in FIG. 2, sink device 6 may include one or more processors 50, one or more communication units 52, one or more user interface (UI) devices 54, and one or more storage devices 56. Each of components 50, 52, 54, and 56 may be interconnected (physically, communicatively, and/or operatively) via communication channels 58 for inter-component communications. In some examples, communication channels 58 may include a system bus, network connection, interprocess communication data structure, or any other channel for communicating data. One or more of storage devices 56, in some examples, may include communication module 19, streaming module 22, texture elements 24, array information 47, shader information 49, and UI module 60.

Processors 50, in some examples, may be configured to implement functionality and/or process instructions for execution within sink device 6. For example, processors 50 may be capable of processing instructions stored in one or more of storage devices 56. Examples of processors 50 may include any one or more microprocessors, digital signal processors (DSPs), application specific integrated circuits (ASICs), field programmable gate arrays (FPGAs), or any other equivalent integrated or discrete logic circuitry, as well as any combinations of such components.

Sink device 6, in some examples, also includes ones or more communication units 52. Sink device 6, in one example, utilizes one or more of communication units 52 to communicate with external devices via one or more networks, such as one or more wireless networks. One or more of communication units 52 may be a network interface card, such as an Ethernet card, an optical transceiver, a radio frequency transceiver, or any other type of device that can send and receive information. Other examples of such network interfaces may include Bluetooth, 3G, and Wi-Fi radios. In some examples, sink device 6 utilizes communication unit 52 to wirelessly communicate with an external device. For instance, sink device 6 may utilize communication unit 52 to wirelessly communicate with communication unit 32 of source device 4 over communication channel 8. In some examples, communication unit 52 may provide received data to other components of sink device 6, such as communication module 19.

Sink device 6, in some examples, may also include one or more UI devices 54. In some examples, one or more of UI devices 54 can be configured to output content, such as video data. For instance, a display of UI devices 54 may be configured to display frames of video data rendered by GPU 20. In addition to outputting content, one or more of UI devices 54 may be configured to receive tactile, audio, or visual input. Some examples of UI devices 54 include video displays, speakers, keyboards, touch screens, mice, cameras, and the like.

Sink device 6, in some examples, may also include UI module 60. UI module 60 can perform one or more functions to receive, content, such as UI data from other components associated with sink device 6 and cause one or more of UI devices 54 to output the content. In some examples, UI module 60 may be configured to receive an indication of input, such as user input, and send the indications of the input to other components associated with sink device 6, such as streaming module 14.

One or more storage devices 56 may be configured to store information within sink device 6 during operation. One or more of storage devices 56, in some examples, may comprise a computer-readable storage medium. In some examples, one or more of storage devices 56 may comprise a temporary memory, meaning that a primary purpose of one or more of storage devices 56 is not long-term storage. One or more of storage devices 56, in some examples, may comprise a volatile memory, meaning that one or more of storage devices 56 does not maintain stored contents when the system is turned off. Example of volatile memories include random access memories (RAM), dynamic random access memories (DRAM), static random access memories (SRAM), and other forms of volatile memories known in the art. In some examples, one or more of storage devices 56 is used to store program instructions for execution by processors 50. One or more of storage devices 56, in one example, may be used by software or modules running on sink device 6 (e.g., communication module 19, streaming module 22, and UI module 60) to temporarily store information during program execution.

One or more of storage devices 56, in some examples, may also include one or more computer-readable storage media. One or more of storage devices 56 may further be configured for long-term storage of information. In some examples, one or more of storage devices 56 may include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Sink device 6, in some examples, may also include look-up-table (LUT) 64. LUT 64 may store a list of graphical commands along with information about the graphical commands. For instance, LUT 64 may store a list of graphical commands along with information about the graphical commands that is identical to a list of graphical commands along with information about the graphical commands stored by LUT 62 of sink device 4.

Figure 3:
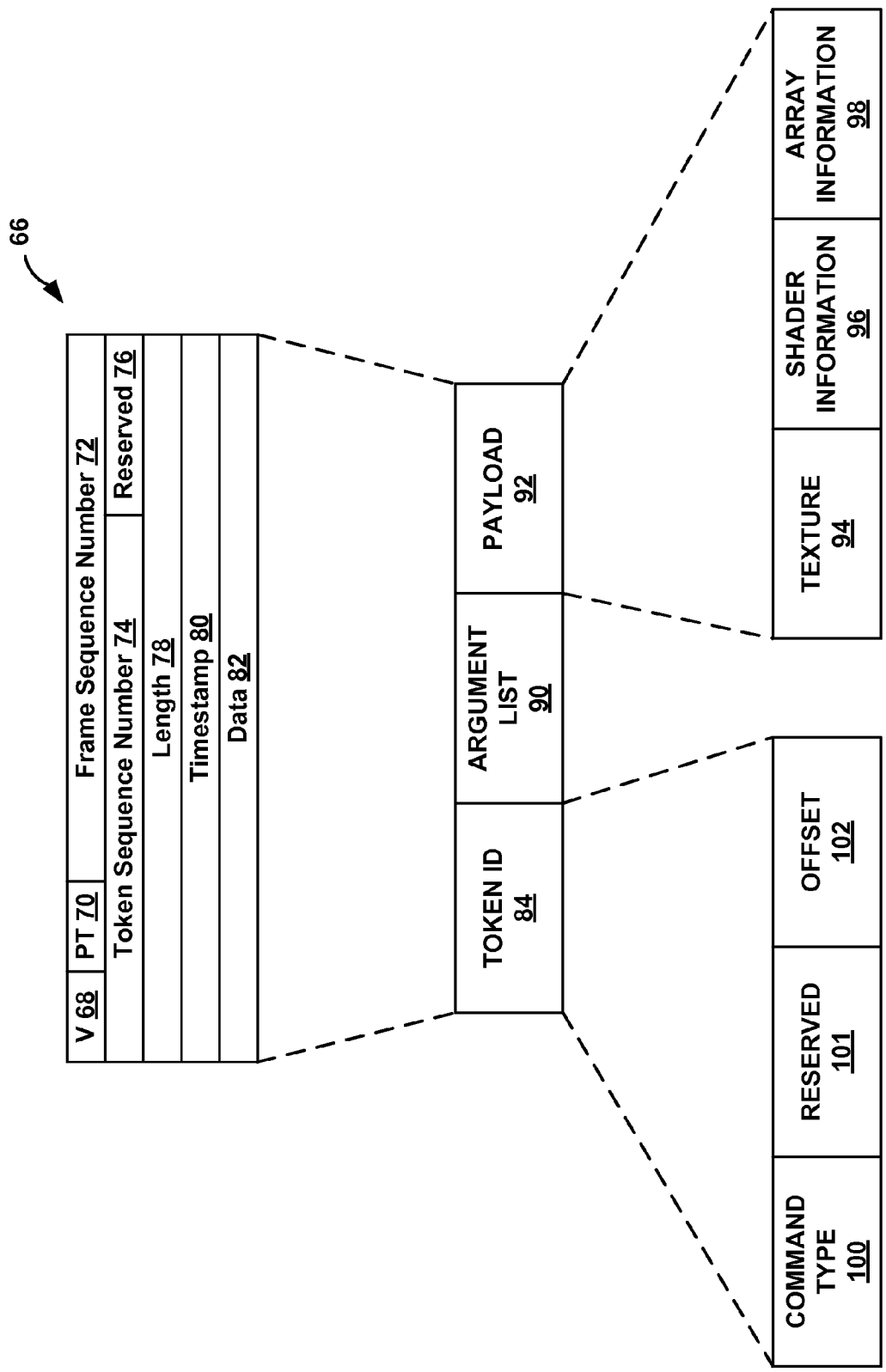
FIG. 3 is a conceptual diagram illustrating an example command frame which may be generated by a source device for transmission to a sink device, in accordance with one or more techniques of this disclosure.

FIG. 3 is a conceptual diagram illustrating an example command frame which may be generated by a source device for transmission to a sink device, in accordance with one or more techniques of this disclosure. In some examples, command frame 66 may include a plurality of fields. For instance, as illustrated in FIG. 3, command frame 66 may include version information (V) 68, payload type (PT) information 70, frame sequence number 72, token sequence number 74, reserved area 76, length information 78, timestamp 80, and data 82.

In some examples, command frame 66 may include version information 68, which may indicate a version of a protocol, such as a graphics entity engine (GEE) protocol, to which command frame 66 complies. In some examples, version information 68 may be two bits in length. For instance, where command frame 66 complies with version 0 of a protocol, version information 68 may be set to 0b00.

In some examples, command frame 66 may include payload type information 70, which may identify command frame 66 as a particular type of frame. In some examples, payload type information 70 may be two bits in length. For instance, where command frame 66 is a GEE frame, payload type information 70 may be set to 0b11.

In some examples, command frame 66 may include frame sequence number 72, which may indicate a respective sequence number of command frame 66. In some examples, frame sequence number 72 may be 12 bits in length. For instance, the value of frame sequence number 72 may start at 0, and may increment by 1 for each subsequent command frame. For example, the value of frame sequence number 72 for a first command frame may be 0, the value of frame sequence number 72 for a second command frame may be 1, and the value of frame sequence number 72 for a third command frame may be 3. In some examples, the value used for frame sequence number 72 may be maintained by a counter (e.g., a modulo-4096 counter) such that the value wraps to 0 after the counter has reached its maximum value (e.g., the value of frame sequence number 72 for a 4096th command frame may be 4096, and the value of frame sequence number 72 for a 4097th command frame may be 0).

In some examples, command frame 66 may include token sequence number 74, which may indicate a token sequence number of command frame 66. In some examples, token sequence number 74 may be 12 bits in length. In some examples, a single command frame 66 may include a single token. In some examples, a single command frame 66 may include a plurality of tokens. For instance, the value of token sequence number 74 may start at 0 for a first command frame, and may increment by the number of tokens included in a current command frame. For example, the value of token sequence number 74 for a first command frame with a single token may be 1, the value of token sequence number 74 for a second command frame with two tokens may be 3, and the value of token sequence number 74 for a third command frame with a single token may be 4. In some examples, the value used for token sequence number 74 may be maintained by a counter (e.g., a modulo-4096 counter) such that the value wraps to 0 after the counter has reached its maximum value (e.g., the value of token sequence number 74 for a command frame that includes a $4096^{th}$ token may be 4096, and the value of token sequence number 74 for a command frame that includes only a $4097^{th}$ token may be 1).

In some examples, command frame 66 may include reserved area 76, which may be reserved for future use. In some examples, reserved area 76 may be 4 bits in length. In some examples, reserved area 76 may be set to all zeros on transmission (e.g., when generated by a source device) and may be ignored on reception (e.g., when processed by a sink device).

In some examples, command frame 66 may include length information 78, which may indicate a length of command frame 66, such as a quantity of bits included in command frame 66. For instance, length information 78 may indicate a length command frame 66 in units of eight bits from the bit offset zero to the end of data 82 (including padding, if any). In some examples, length information 78 may be 16 bits in length.

In some examples, command frame 66 may include timestamp 80, which may indicate a particular time. For instance, timestamp 80 may indicate a target transmission time of the first byte of command frame 66. In some examples, timestamp 80 may indicate the last 16 bits of the timestamp derived from a clock of a source device that generated command frame 66, such as a 90 KHz clock reference synchronized to the system stream PCR (MPEG2-TS).

In some examples, command frame 66 may include data 82, which may include one or more fields. As illustrated in FIG. 3, data 82 may include token ID 84, argument list 90, and payload 92.

In some examples, data 82 may include token ID 84, which may indicate a particular graphical command. As one example, where the graphical commands are from a defined set of graphical commands, token ID 84 may be a value that identifies the respective graphical command within the defined set of graphical commands. For instance, each respective value of token ID 84 may correspond to a respective OpenGL command or EGL command. In some examples, token ID 84 may be 32 bits (4 octets) in length. In some examples, as opposed to being the absolute ID of the particular graphical command, token ID 84 may represent the absolute token ID by indicating a command type and an offset value. In this way, source device 4 may encode the absolute token ID. Sink device 6 may decode the absolute token ID based on the indicated command type and the offset value. As illustrated in FIG. 3, token ID 84 may include command type 100, reserved area 101, and offset 102.

In some examples, command type 100 may indicate the set of graphical commands from which the particular graphical command indicated by token ID 84 is selected. As one example, command type 100 may be set to 1 to indicate an OpenGL graphical command. As another example, command type 100 may set to 0 to indicate an EGL graphical command.

In some examples, reserved area 101 may be reserved for future use. In some examples, reserved area 101 may be one octet in length. In some examples, reserved area 101 may be set to all zeros on transmission (e.g., when generated by a source device) and may be ignored on reception (e.g., when processed by a sink device).

In some examples, offset 102 may indicate an offset of the particular graphical command from a first command in the set of graphical commands from which the particular graphical command indicated by token ID 84 is selected.

In some examples, the absolute token ID of a first OpenGL command (e.g., OpenGLCmd_one) in the set of OpenGL commands (i.e., the enumeration list) may be defined in accordance with equation (1), below, where OpenGL-version indicates a version of the set of OpenGL commands from which OpenGLCmd_one is selected. In some examples, the value of OpenGL-version may be determined during capability exchange, such as with the wfd_gee_capability parameter. As one example, the value of OpenGL-version may be determined during the data flow illustrated by FIG. 5.

$$OpenGLCmd\_one = OpenGL\text{-}version | Reserved \quad (1)$$

In some examples, the absolute token ID of an OpenGL command for an Offset value of N may be determined in accordance with equation (2), below.

$$OpenGLCmd\_N = OpenGLCmd\_one + N \quad (2)$$

In some examples, the absolute token ID of a first EGL command (e.g., EGLCmd_one) in the set of EGL commands (i.e., the enumeration list) may be defined in accordance with equation (3), below, where EGL-version indicates a version of the set of EGL commands from which EGLCmd_one is selected. In some examples, the value of EGL-version may be determined during capability exchange, such as with the wfd_gee_capability parameter. As one example, the value of EGL-version may be determined during the data flow illustrated by FIG. 5.

$$EGLCmd\_one = EGL\text{-}version | Reserved \quad (3)$$

In some examples, the absolute token ID of an EGL command for an Offset value of N may be determined in accordance with equation (4), below.

$$EGLCmd\_N = EGLCmd\_one + N \quad (4)$$

In some examples, data 82 may include an instance ID, which may identify a particular thread corresponding to token ID 84. For instance, where the video data streamed includes a plurality of threads, an instance ID may identify which thread of the plurality of threads is associated with the graphical command identified by token ID 84. In some examples, instance ID 84 may be 32 bits (4 octets) in length.

In some examples, data 82 may include a length field, which may indicate a length of one or more fields included in data 82. For instance, the length field may indicate a length of one or more fields of data 82 following the length field, such as argument list 90 and payload 92. In some examples, the length field may be 32 bits (4 octets) in length.

In some examples, data 82 may include argument list 90, which may include one or more arguments associated with the graphical command identified by token ID 84. For instance, where the graphical command identified by token ID 84 takes a first argument and a second argument as input, argument list 90 may include the first argument and the second argument.

In some examples, data 82 may include payload 92, which may include one or more payload items. As illustrated in FIG. 3, payload 92 may include texture 94, shader information 96, and array information 98.

In some examples, payload 92 may include texture 94, which may include one or more texture images. For instance, payload 92 may include one or more texture images utilized by a GPU that executes the graphical command identified by token ID 84.

In some examples, payload 92 may include shader information 96. Some examples of shader information 96 may include, but are not limited to, vertex shaders, tessellation control and evaluation shaders, geometry shaders, fragment shaders, and compute shaders. In some examples, payload 92 may include array information 98. In some examples, array information 98 may include one or more vertex arrays.

In some examples, such as where a size of data 82 is greater than a size that can be included in a single command frame, data 82 may be divided up and included in a plurality of command frames. In such examples, each of the plurality of command frames may include identical values for frame sequence number 72 and identical values for token sequence number 74. In other words, two or more command frames may have the same frame sequence number 72 and same token sequence number 74, such as where they carry fragments of the same data.

Referring now to FIGS. 2 and 3 and in accordance with one or more techniques of this disclosure, source device 4 may stream video to sink device 6 in the form of a plurality of command frames. In some examples, source device 4 may establish a wireless display (e.g., Miracast) session with sink device 6. While establishing the wireless display session, source device 4 may determine whether sink device 6 supports receiving video data in the form of command frames. Responsive to determining that sink device 6 supports receiving video data in the form of command frames, source device 4 may generate a plurality of graphical commands renderable into video data along with one or more texture elements, and generate a plurality of command frames that each correspond to at least one graphical command of the plurality of graphical commands. Source device 4 may output the plurality of command frames for wireless transmission to sink device 6. In this way, a user of source device 4 may stream video data from source device 4 to sink device 6 using the graphics domain transmission method within a wireless display session.

In some examples, responsive to determining that sink device 6 does not support receiving video data in the form of command frames, source device 4 may stream video data to sink device 6 using the pixel domain transmission method. In this way, the user of source device 4 may still stream video data from source device 4 to sink device 6 within the wireless display session.

As discussed above, source device 4 may determine whether sink device 6 supports receiving video data in the form of command frames. For instance, capability module 44 of streaming module 14 of source device 4 may generate a real time streaming protocol (RTSP) message that includes a request for sink device 6 to indicate whether sink device 6 supports receiving video in the form command frames. As one example, capability module 44 may generate an RTSP M3 request message including a GET_PARAMETER request with a parameter "wfd_gee_capability." In any case, capability module 44 may cause communication module 10 to transmit the request message to sink device 6.

Responsive to receiving the request message, capability module 43 of streaming module 22 of sink device 6 may generate a response that indicates whether sink device 6 supports receiving video data in the form of command frames. As one example, if sink device 6 supports receiving video data in the form of command frames, capability module 43 may generate an RTSP M3 response message including a GET_PARAMETER response with the parameter "wfd_gee_capability" qualified as "Supported". As another example, if sink device 6 supports receiving video data in the form of command frames, capability module 43 may generate an RTSP M3 response message including a GET_PARAMETER response with the parameter "wfd_gee_capability" qualified by a version of one of more sets of graphical commands supported by sink device 6. As another example, if sink device 6 does not support receiving video data in the form of command frames, capability module 43 may generate an RTSP M3 response message including a GET_PARAMETER response with the parameter "wfd_gee_capability" qualified as "none". In some examples, such as where sink device 6 supports receiving video data in the form of command frames, the response message may indicate a TCP port number and/or a UDP port number to be used. In some examples, the TCP port number and/or the UDP port number may not be set by sink device 6 and may be indicated in the reply message as "none." As discussed above, the response message may indicate a version of one of more sets of graphical commands supported by sink device 6. For instance, the response message may indicate a highest OpenGL version supported by sink device 6 and/or a highest EGL version supported by sink device 6. In any case, capability module 43 may cause communication module 19 to transmit the response message to source device 4.

Responsive to receiving the response message, capability module 44 may determine whether sink device 6 supports receiving video data in the form of command frames. As one example, where the response message indicates that "wfd_gee_capability" is qualified by "Supported", capability module 44 may determine that sink device 6 supports receiving video data in the form of command frames. As one example, where the response message indicates that "wfd_gee_capability" is qualified by "none", capability module 44 may determine that sink device 6 does not support receiving video data in the form of command frames.

Where capability module 44 determines that sink device 6 supports receiving video data in the form of command frames, capability module 44 may establish which ports will be used to exchange command frames. For instance, capability module 44 may establish a TCP port number and/or a UDP port number. As one example, capability module 44 may generate a RTSP M4 request message including a SET_PARAMETER request with the parameter "wfd_gee_capability" qualified by "TCPport=[TCPport]" and/or "UDPport=[UDPport]" where TCPport is the TCP port number and UDPport is the UDP port number.

In some examples, the request message may indicate a version of one of more sets of graphical commands to be used to transmit video data in the form of command frames. In some examples, capability module 44 may determine the version of one of more sets of graphical commands to be used to transmit video data in the form of command frames by comparing the version information received from sink device 6 with version information of source device 4. In some examples, capability module 44 may select the highest common version as the version of one of more sets of graphical commands to be used to transmit video data in the form of command frames. As one example, the request message may indicate a highest OpenGL version supported by both sink device 6 and source device 4. As another example, the request message may indicate a highest EGL version supported by both sink device 6 and source device 4. In any case, capability module 44 may cause communication module 10 to transmit the request message to sink device 6.

Responsive to receiving the request message, capability module 43 may configure streaming module 22 to receive command frames at one or both of the designated ports. In some examples, capability module 43 may acknowledge that streaming module 22 is configured to receive command frames at one or both of the designated ports. As one example, capability module 43 may generate an RTSP M4 response message including a SET_PARAMETER_RESPONSE qualified by "OK". As another example, capability module 43 may generate an RTSP M4 response message including a SET_PARAMETER response with the parameter "wfd_gee_capability" qualified by "TCPport=[TCPport]" and/or "UDPport=[UDPport]" where TCPport is the TCP port number indicated by the request message received from source device 4 and UDPport is the UDP port number indicated by the request message received from source device 4. In any case, capability module 43 may cause communication module 19 to transmit the response message to source device 4.

As discussed above, responsive to determining that sink device 6 supports receiving video data in the form of command frames, source device 4 may generate a plurality of tokens (i.e., particular instances of graphical commands) renderable into video data along with one or more texture elements. For instance, one or more of application module 18 may output a plurality of graphical commands that cause GPU 12 to render one or more frames of video data.

Streaming module 14 may capture the plurality of tokens at an input of GPU 12 and generate a plurality of command frames that each correspond to at least one token of the plurality of tokens. For instance, framing module 42 of streaming module 14 may generate each command frame of the plurality of command frames in accordance with the techniques of FIG. 3. As one example, streaming module 14 may generate each command frame of the plurality of command frames such that each respective command frame includes an identification of the corresponding at least one graphical command (e.g., token ID 84 of FIG. 3), and one or more arguments associated with the corresponding at least one token (e.g., argument list 90 of FIG. 3).

For example, responsive to capturing a particular token of funcX having a first argument and a second argument, framing module 42 may generate a command frame that corresponds to the particular token of funcX. For instance, framing module 42 may reference LUT 62 to determine a token ID corresponding to funcX. For instance, framing module 42 may determine a token ID corresponding to funcX by determining a command type and an offset (e.g., command type 100 and offset 102 of FIG. 3) of funcX. In some examples, framing module 42 may determine the offset in accordance with one or more of equations (1)-(4), above. Using the determined token ID, framing module 42 may generate the command frame that corresponds to the particular token of funcX as including the token ID corresponding to funcX, the first argument, and the second argument.

In some examples, one or more of the arguments included in a particular command frame may be a pointer that references data stored at source device 4. In accordance with one or more techniques of this disclosure, as opposed to outputting the particular command frame with the pointer, framing module 42 may dereference the pointer such that the particular command frame includes the data in the graphical command. In this way, streaming module 14 may enable sink device 6 to execute the graphical command without attempting to reference data stored at source device 4.

In some examples, when executed by a GPU, one or more of the tokens included in a particular command frame may correspond to graphical commands that act on one or more texture elements. As such, in some examples, framing module 42 may include the one or more texture elements in the particular command frame (e.g., as texture 94 of payload 92 as illustrated in FIG. 3). In some examples, framing module 42 may determine whether or not the one or more texture elements are already stored at sink device 6 (i.e., in texture elements 24). For instance, the one or more texture elements may already be stored in texture elements 24 if they were included in a previously transmitted command frame. If the one or more texture elements are already stored at sink device 6, framing module 42 may omit the one or more texture elements already stored at sink device 6 from the particular command frame. If the one or more texture elements are not already stored at sink device 6, framing module 42 may include the one or more texture elements not already stored at sink device 6 in the particular command frame.

In some examples, one or more of the tokens included in a particular command frame may be associated with array information. As such, in some examples, framing module 42 may include the array information in the particular command frame (e.g., as array information 98 of payload 92 as illustrated in FIG. 3). Similar to texture elements, framing module 42 may determine whether or not the array information associated with the one or more of the tokens included in a particular command frame are already stored at sink device 6 (i.e., in array information 47) and may omit array information already stored at sink device 6.

In some examples, one or more of the tokens included in a particular command frame may be associated with shader information. As such, in some examples, framing module 42 may include the shader information in the particular command frame (e.g., as shader information 96 of payload 92 as illustrated in FIG. 3). Similar to texture elements, framing module 42 may determine whether or not the shader information associated with the one or more of the tokens included in a particular command frame are already stored at sink device 6 (i.e., in shader information 49) and may omit shader information already stored at sink device 6.

In some examples, framing module 42 may apply content protection to one or more the plurality of command frames. For instance, framing module 42 may apply content protection to one or more the plurality of command frames in accordance with High-bandwidth Digital Content Protection (HDCP). More information for the HDCP can be found in the document of Digital Content Protection LLC entitled "High-bandwidth Digital Content Protection: Interface Independent Adaptation," Revision 2.2 dated Oct. 16, 2012 and available at http://www.digital-cp.com/hdcp_specifications.

As discussed above, source device 4 may output the plurality of command frames for wireless transmission to sink device 6. For instance, streaming module 14 output the plurality of command frames to communication module 10 which may cause one or more of communication unit 32 to transmit the plurality of command frames to sink device 6 via communication channel 8, such as by using a direct Wi-Fi connection.

In some examples, communication module 10 may select a communication protocol to use when outputting the plurality of command frames to sink device 6. For instance, communication module 10 may determine whether to output the plurality of command frames using a transmission control protocol (TCP) or a user datagram protocol (UDP). In some examples, communication module 10 may determine whether to output the plurality of command frames using the TCP or the UDP based on one or more channel conditions of the link between source device 4 and sink device 6. As one example, responsive to determining that a quality metric (e.g., packet error rate) of communication channel 8 does not satisfy a quality threshold, communication module 10 may output the plurality of command frames using the TCP. As another example, responsive to determining that the quality metric of communication channel 8 satisfies the quality threshold, communication module 10 may output the plurality of command frames using the UDP. In some examples, communication module 10 may maintain a particular communication protocol throughout a wireless display session (i.e., from session establishment to session teardown) For instance, communication module 10 may output the plurality of command frames using TCP for an entire wireless display session. In some examples, communication module 10 may change between communication protocols during a wireless display session. For instance, communication module 10 may begin outputting command frames using TCP until determining that the quality metric of communication channel 8 ceases to satisfy the quality threshold, in response to which communication module 10 may begin outputting command frames using UDP.

In any case, responsive to receiving the plurality of command frames from source device 4, sink device 6 may decode the plurality of command frames to reconstruct the plurality of tokens. For instance, reconstructing module 41 of streaming module 22 may reconstruct each respective token indicated by a particular command frame by determining which graphical command of a set of graphical commands is indicated by a respective token ID included in the particular command frame. For instance, reconstructing module 41 may reference LUT 64 to determine which graphical command of a set of graphical commands is indicated by the respective token ID.

In some examples, reconstructing module 41 may also reference LUT 64 to determine respective lengths for each argument associated with the graphical command indicated by the respective tokenID. For instance, reconstructing module 41 may determine that a first argument is 1 byte long and a second argument is 10 bytes long. Reconstructing module 41 may extract the one or more arguments associated with the respective token ID based on the determined lengths. For instance, where a total length of the one more arguments (e.g., the total length of argument list 90) is 11 bytes, reconstructing module 41 may extract the first byte as the first argument and the remaining 10 bytes as the second argument. In this way, reconstructing module 41 may reconstruct the respective token.

In some examples, one or more the plurality of command frames may include one or more texture elements. As such, when processing the plurality of command frames, reconstructing module 41 may store the one or more texture elements at texture elements 24.

In some examples, reconstructing module 41 may remove content protection from one or more the plurality of command frames. For instance, reconstructing module 41 may remove content protection from one or more the plurality of command frames in accordance with High-bandwidth Digital Content Protection (HDCP). In this way, reconstructing module 41 may remove content protection in a manner complimentary to the manner in which the content protection was applied (e.g., by framing module 42).

Sink device 6 may render video data using the reconstructed tokens. For instance, reconstructing module 41 may output the reconstructed tokens to cause GPU 20 to render the video data. In this way, sink device 6 may render video data based on command frames. In some examples, GPU 20 may render the video data based on the reconstructed tokens and one or more of texture elements 24, array information 47, and shader information 49.

Figure 4:
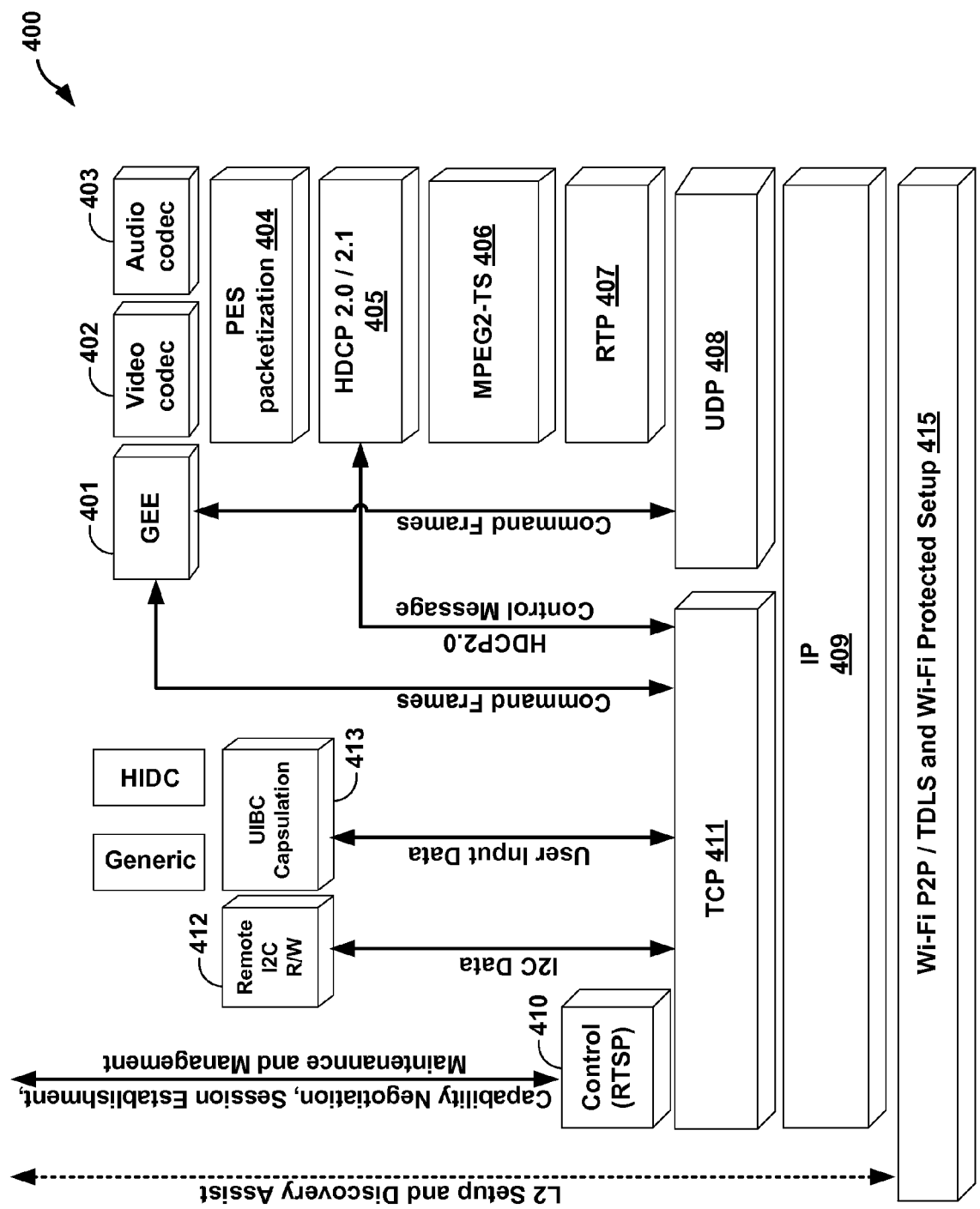
FIG. 4 is a conceptual diagram illustrating example data and control plane connections in a sink device or a source device, in accordance with one or more techniques of this disclosure.

FIG. 4 is a conceptual diagram illustrating example data and control plane connections in a sink device or a source device, in accordance with one or more techniques of this disclosure. As shown in FIG. 4, data and control plane connections 400 include data plane connections and control plane connections. The data plane connections of FIG. 4 include graphics entity engine (GEE) 401, video codec 402, audio codec 403, PES packetization 404, content protection 405 (e.g., HDCP 2.0/2.1), and MPEG2-TS 406 over RTP 407/UDP 408/IP 409. The control plane connections of FIG. 4 include RTSP 410 over TCP 411/IP 409, remote I2C read/write 412, user interface back channel (UIBC) 413 (e.g., generic or human interface device class (HIDC)). Additionally, as illustrated in FIG. 4, data and control plane connections 400 may include Wi-Fi P2P/TDLS and Wi-Fi protected setup block 415 which enable layer-2 connectivity (e.g., using Wi-Fi P2P and/or TDLS).

In accordance with one or more techniques of this disclosure, GEE 401 may be configured to send and/or receive and decode video data in the form of tokens and texture elements. As discussed above, the tokens and texture elements may be transmitted in the form of command frames. As illustrated in FIG. 4, GEE 401 may receive command frames via TCP 411 or UDP 408. In this way, GEE 401 may perform the operations of streaming module 14 and/or streaming module 22.

Figure 5:
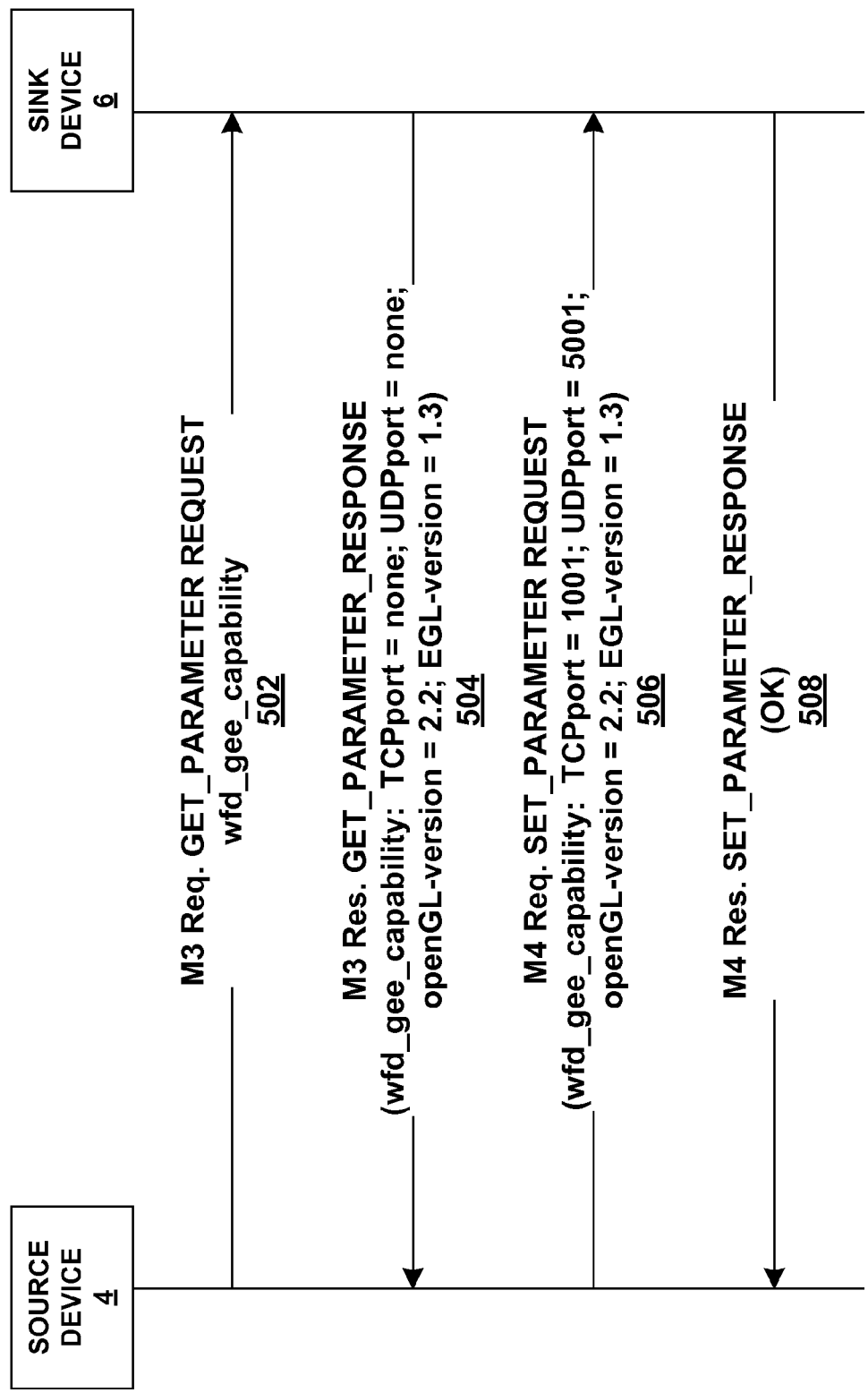
FIG. 5 is a communication flow diagram illustrating example data flow between a sink device and a source device performing techniques to determine whether the sink device supports receiving video data in the form of command frames, in accordance with one or more techniques of the present disclosure.

FIG. 5 is a communication flow diagram illustrating example data flow between a sink device and a source device performing techniques to determine whether the sink device supports receiving video data in the form of command frames, in accordance with one or more techniques of the present disclosure. The techniques of FIG. 5 may be performed by one or more processors of a computing device, such as source device 4 illustrated in FIGS. 1 and 2. For purposes of illustration, the techniques of FIG. 5 are described within the context of source device 4 and sink device 6 illustrated in FIGS. 1 and 2, although computing devices having configurations different than that of source device 4 may perform the techniques of FIG. 5.

In accordance with one or more techniques of this disclosure, source device 4 may determine whether sink device 6 supports receiving video data in the form of command frames that correspond to tokens of graphical commands. For instance, source device 4 may output M3 request message 502 including a GET_PARAMETER REQUEST with a parameter "wfd_gee_capability" to sink device 6.

Responsive to receiving request message 502, sink device 6 may generate a response that indicates whether sink device 6 supports receiving video data in the form of command frames. For instance, if sink device 6 supports receiving video data in the form of command frames, sink device 6 may output, to source device 4, M3 response message 504 including a GET_PARAMETER RESPONSE with the parameter "wfd_gee_capability" qualified as "Supported." In some examples, response message 504 may indicate a TCP port number and/or a UDP port number to be used. As illustrated in the example of FIG. 5, the TCP port number and/or the UDP port number may not be set by sink device 6 and may be indicated in the reply message as "none."

In some examples, M3 response message 504 may indicate a version of one of more sets of graphical commands supported by sink device 6. For instance M3 response message 504 may indicate a highest OpenGL version supported by sink device 6 (i.e., openGL-version=2.2) and/or a highest EGL version supported by sink device 6 (i.e., EGL-version=1.3). In some examples, the openGL-version field may include a major portion and a minor portion of the openGL version, which may be numeric. In some examples, sink device 6 may determine the values of the major portion and the minor portion of the openGL version as the major and minor values returned by a glGetString query performed at sink device 6. In some examples, the EGL-version field may include a major portion and a minor portion of the EGL version, which may be numeric. In some examples, sink device 6 may determine the values of the major portion and the minor portion of the EGL version as the major and minor values returned by an eglInitalize query performed at sink device 6.

Responsive to receiving response message 504, source device 4 may determine whether sink device 6 supports receiving video data in the form of command frames. As one example, where response message 504 indicates that "wfd_gee_capability" is qualified by "Supported", capability module 44 may determine that sink device 6 supports receiving video data in the form of command frames. As another example, where response message 504 indicates that "wfd_gee_capability" is qualified by one or more versions of graphical commands, capability module 44 may determine that sink device 6 supports receiving video data in the form of command frames. As another example, where response message 504 indicates that "wfd_gee_capability" is qualified by "none", capability module 44 may determine that sink device 6 does not support receiving video data in the form of command frames. In this way, source device 4 may determine whether sink device 6 supports receiving video data in the form of command frames.

Where source device 4 determines that sink device 6 supports receiving video data in the form of command frames, source device 4 may establish which ports will be used to exchange command frames. For instance, source device 4 may establish a TCP port number and/or a UDP port number. As one example, source device 4 may output, to sink device 6, M4 request message 506 including a SET_PARAMETER request with the parameter "wfd_gee_capability" qualified by "TCPport=[TCPport]" and/or "UDPport=[UDPport]" where TCPport is the TCP port number and UDPport is the UDP port number.

In some examples, M4 request message 506 may indicate a version of one of more sets of graphical commands to be used to transmit video data in the form of command frames. In some examples, source device 4 may determine the version of one of more sets of graphical commands to be used to transmit video data in the form of command frames by comparing the version information received from sink device 6 (i.e., in M3 response message 504) with version information of source device 4. In some examples, source device 4 may select the highest common version as the version of one of more sets of graphical commands to be used to transmit video data in the form of command frames. For instance, where source device 4 supports at least openGL-version 2.2 and EGL-version 1.3, source device 4 may select openGL-version 2.2 and EGL-version 1.3 to be used to transmit video data in the form of command frames from source device 4 to sink device 6.

Responsive to receiving request message 506, sink device 6 may prepare to receive command frames at one or both of the designated ports. In some examples, sink device 6 may acknowledge that sink device 6 is configured to receive command frames at one or both of the designated ports. As one example, sink device 6 may output M4 response message 508 qualified by "OK". As another example, sink device 6 may output M4 response message 508 including a SET_PARAMETER response with the parameter "wfd_gee_capability" qualified by "TCPport=[TCPport]" and/or "UDPport=[UDPport]" where TCPport is the TCP port number indicated by request message 506 and UDPport is the UDP port number indicated by request message 506. In this way, where sink device 6 supports receiving video data in the form of command frames, source device 4 and sink device 6 may negotiate and/or establish a communication session.

Figure 6:
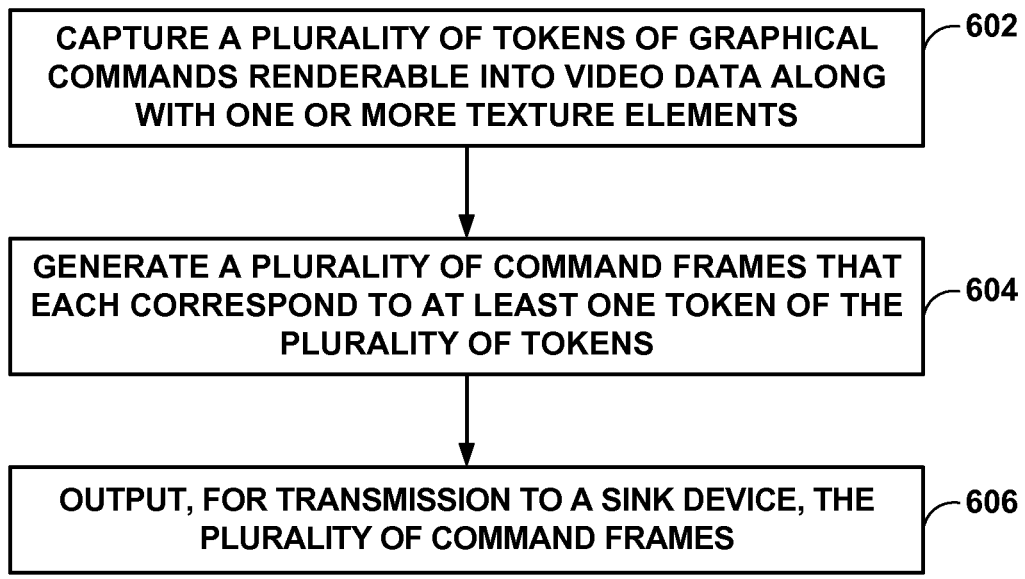
FIG. 6 is a flow diagram illustrating example operations of a source device to stream video data to a sink device, in accordance with one or more techniques of the present disclosure.

FIG. 6 is a flow diagram illustrating example operations of a source device to stream video data to a sink device, in accordance with one or more techniques of the present disclosure. The techniques of FIG. 6 may be performed by one or more processors of a computing device, such as source device 4 illustrated in FIGS. 1 and 2. For purposes of illustration, the techniques of FIG. 6 are described within the context of source device 4 illustrated in FIGS. 1 and 2, although computing devices having configurations different than that of source device 4 may perform the techniques of FIG. 6.

In accordance with one or more techniques of this disclosure, streaming module 14 of source device 4 may capture a plurality of tokens of graphical commands renderable into video data along with one or more texture elements (602). For example, streaming module 14 may capture the plurality of texture elements and tokens at an input of a GPU included in source device 4, such as GPU 12.

Framing module 42 of streaming module 14 may generate a plurality of command frames that each correspond to at least one token of the plurality of tokens (604). In some examples, framing module 42 may generate a plurality of command frames in accordance with the techniques of FIG. 3. For instance, each respective command frame of the plurality of command frames may include an identification of at least one graphical command corresponding to the at least one token, and one or more arguments associated with the at least one token.

Framing module 42 of streaming module 14 may output, for transmission to a sink device, the plurality of command frames (606). For example, streaming module 14 may output the plurality of command frames to communication module 10 which may cause one or more of communication units 32 to transmit the plurality of command frames to a sink device, such as sink device 6 of FIGS. 1 and 2, via a wired and/or wireless communication link between source device 4 and the sink device, such as communication channel 8 of FIGS. 1 and 2.

Figure 7A:
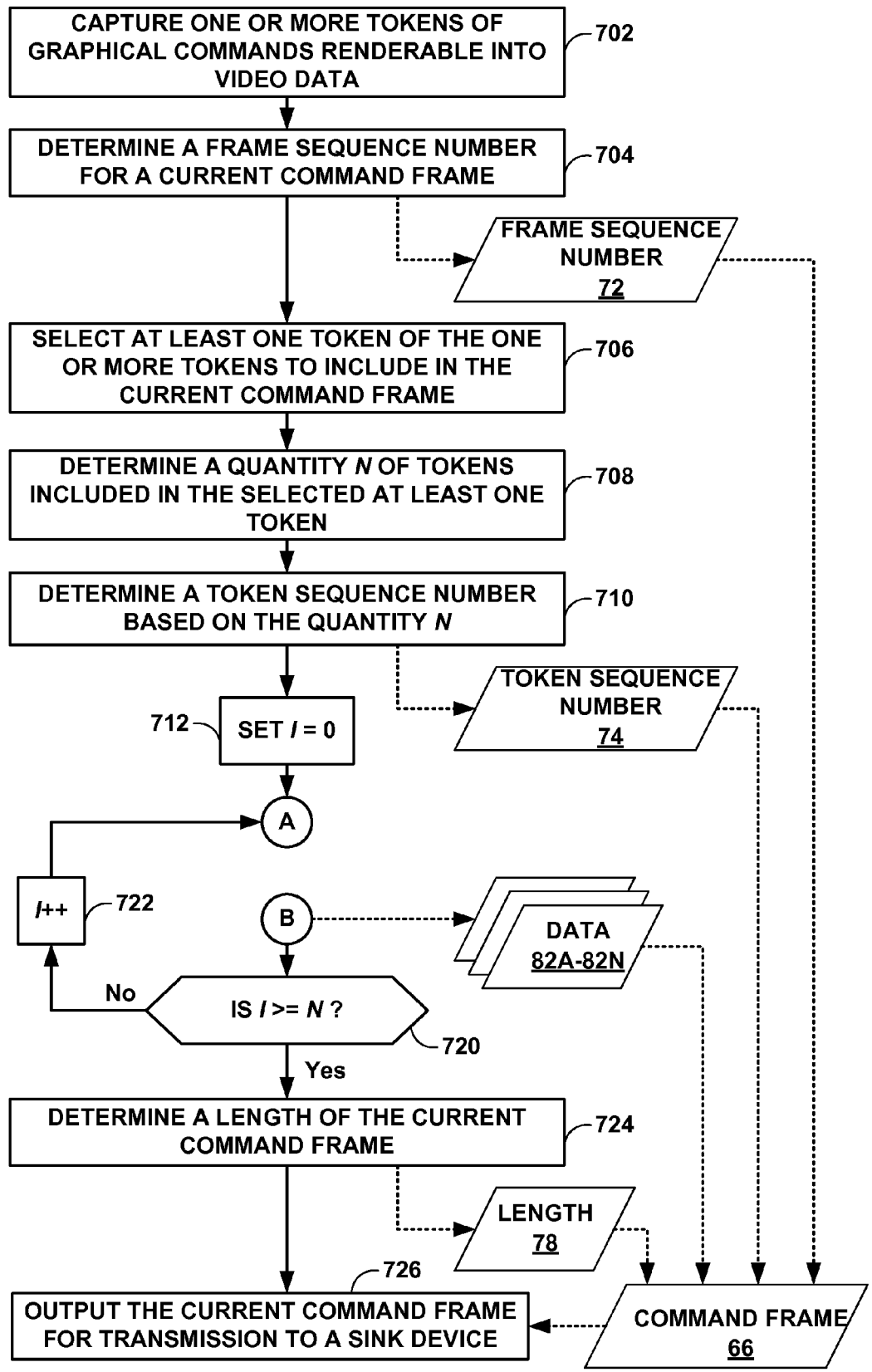
FIGS. 7A and 7B are flow diagrams illustrating example operations of a source device to stream video data to a sink device, in accordance with one or more techniques of the present disclosure.
Figure 7B:
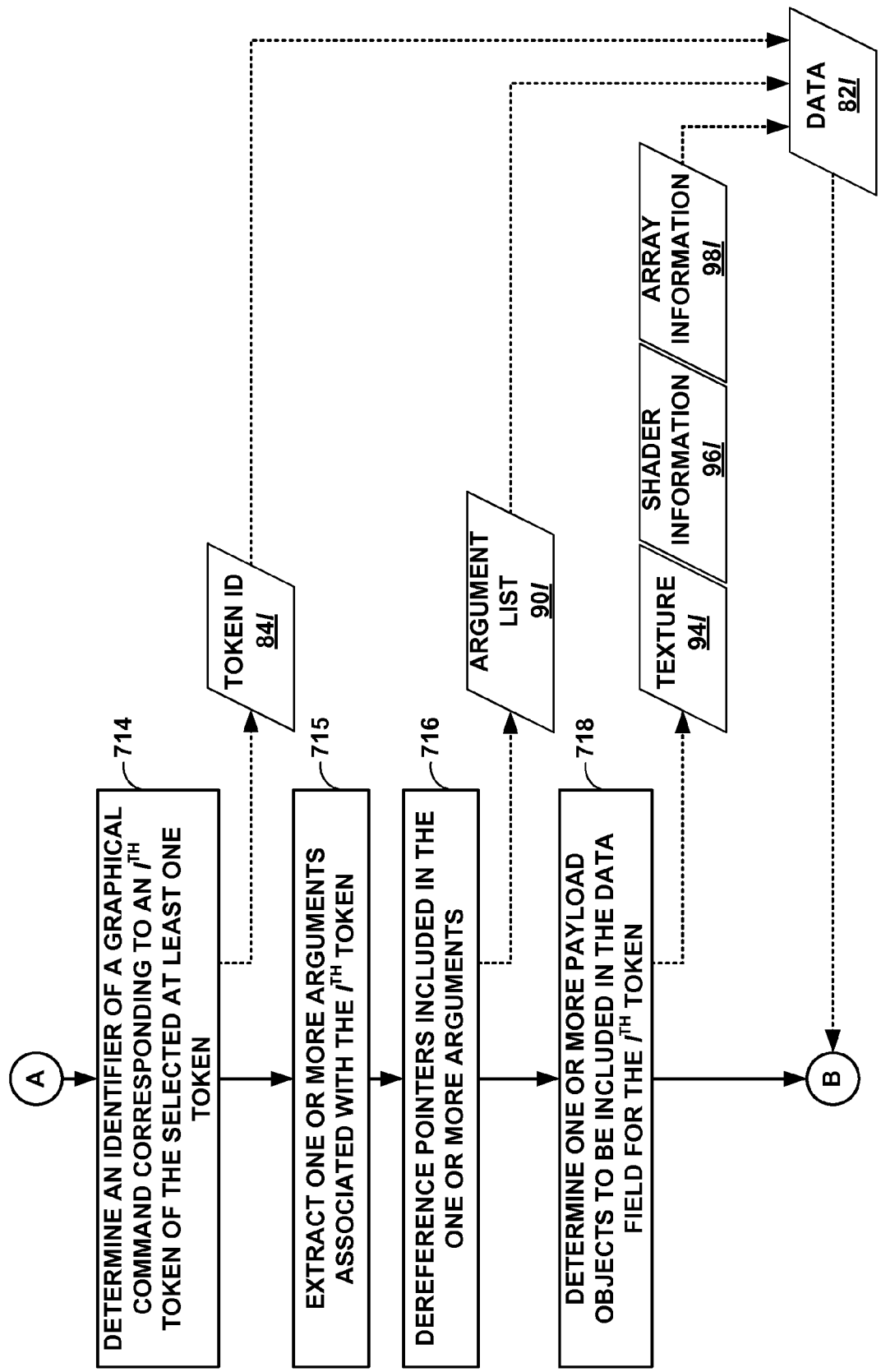

FIGS. 7A and 7B are flow diagrams illustrating example operations of a source device to stream video data to a sink device, in accordance with one or more techniques of the present disclosure. The techniques of FIGS. 7A and 7B may be performed by one or more processors of a computing device, such as source device 4 illustrated in FIGS. 1 and 2. For purposes of illustration, the techniques of FIGS. 7A and 7B are described within the context of source device 4 illustrated in FIGS. 1 and 2, although computing devices having configurations different than that of source device 4 may perform the techniques of FIGS. 7A and 7B.

In accordance with one or more techniques of this disclosure, streaming module 14 of source device 4 may capture one or more tokens of graphical commands renderable into video data (702). For example, streaming module 14 may capture the one or more tokens at an input of a GPU included in source device 4, such as GPU 12.

Framing module 42 of streaming module 14 may generate a plurality of command frames that each correspond to at least one token of the one or more tokens. For instance, framing module 42 may determine a frame sequence number for a current command frame (i.e., frame sequence number 72 for command frame 66) (704). As discussed above, framing module 42 may increment the frame sequence number by one for each new command frame.

Framing module 42 may select at least one token of the one or more tokens to include in a current command frame (706). As one example, framing module 42 may select a single token from the one or more tokens. As another example, framing module 42 may select a plurality of tokens from the one or more tokens.

Framing module 42 may determine a quantity N of tokens included in the selected at least one token (708). Based on the determined quantity N, framing module 42 may determine a token sequence number (i.e., token sequence number 74) (710). As discussed above, framing module 42 may increment the token sequence number by the quantity of tokens to be included in the current command frame.

Framing module 42 may generate a respective data field for each token of the selected at least one token to be included in the current command frame. For instance, framing module 42 may set an index value I to zero, and, advancing through "A", determine an identifier of a graphical command corresponding to an $I^{th}$ token of the selected at least one token (i.e., token ID 84I) (714). As discussed above, framing module 42 may determine the identifier of a graphical command corresponding to the $I^{th}$ token of the selected at least one token by referencing LUT 62. For instance, framing module 42 may determine token ID 84I by determining a command type and an offset (e.g., command type 100 and offset 102 of FIG. 3) of the graphical command corresponding to the $I^{th}$ token. In some examples, framing module 42 may determine the offset in accordance with one or more of equations (1)-(4), above. Framing module 42 may extract one or more arguments associated with the $I^{th}$ token of the selected at least one token (715), and, if any of the extracted arguments include a pointer, framing module 42 may dereference the pointers to generate argument list 90I (716). Framing module 42 may determine one or more payload objects to be included in the data field for the $I^{th}$ token (718). For instance, framing module 42 may select one or more of texture elements 94I, shader information 96I, and array information 98I.

Framing module 42 may generate data field 82I for the $I^{th}$ token based on token ID 84I, argument list 90I, and the determined one or more payload objects, and, advancing through "B", determine whether the $I^{th}$ token is the last token of the selected at least one token of the one or more tokens to be included in the current command frame (i.e., whether I is greater than or equal to N) (720). If the $I^{th}$ token is not the last token of the selected at least one token of the one or more tokens to be included in the current command frame ("No" branch of 720), framing module may increment I (722), and generate a respective data field for the new $I^{th}$ token (722).

If the $I^{th}$ token is the last token of the selected at least one token of the one or more tokens to be included in the current command frame ("Yes" branch of 720), framing module may determine a length of the current command frame (i.e., length 78) (724). Framing module 42 may generate the current command frame (i.e., command frame 66) based on frame sequence number 72, token sequence number 74, respective data fields 82A-82N, and length 78. In some examples, framing module 42 may generate the current command frame based on one or more additional fields, such as the additional fields illustrated in FIG. 3 (e.g., version 68, timestamp 80).

In any case, framing module 42 may output, for transmission to a sink device, the current command frame (726). For example, framing module 42 may output the plurality of command frames to communication module 10 which may cause one or more of communication units 32 to transmit the plurality of command frames to a sink device, such as sink device 6 of FIGS. 1 and 2, via a wired and/or wireless communication link between source device 4 and the sink device, such as communication channel 8 of FIGS. 1 and 2. In this way, source device 4 may transmit video data to sink device 6 in the form of command frames.

Figure 8:
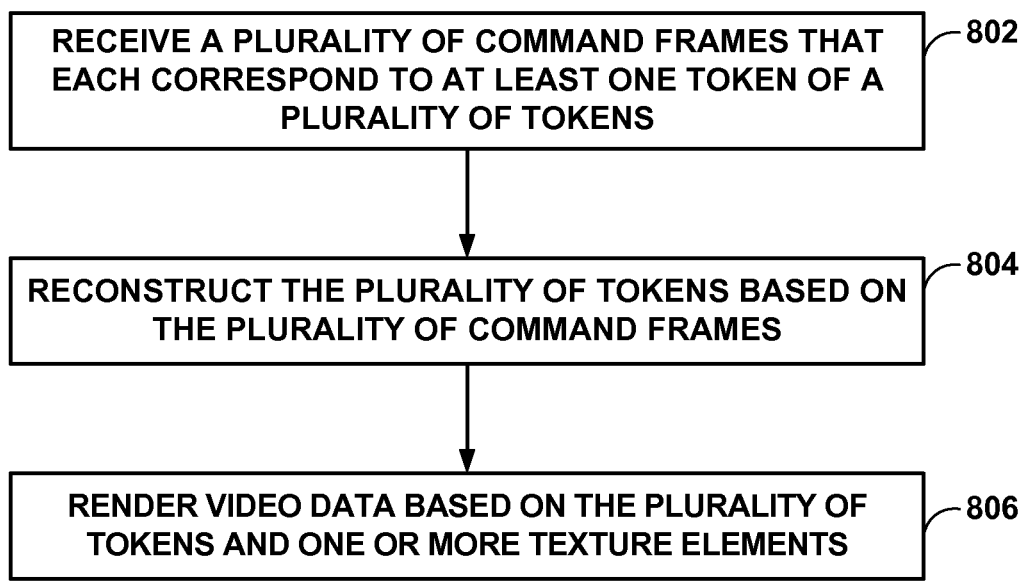
FIG. 8 is a flow diagram illustrating example operations of a sink device to receive video data streamed from a source device, in accordance with one or more techniques of the present disclosure.

FIG. 8 is a flow diagram illustrating example operations of a sink device to receive video data streamed from a source device, in accordance with one or more techniques of the present disclosure. The techniques of FIG. 8 may be performed by one or more processors of a computing device, such as sink device 6 illustrated in FIGS. 1 and 2. For purposes of illustration, the techniques of FIG. 8 are described within the context of sink device 6 illustrated in FIGS. 1 and 2, although computing devices having configurations different than that of sink device 6 may perform the techniques of FIG. 8.

In accordance with one or more techniques of this disclosure, streaming module 22 of sink device 6 may receive a plurality of command frames that each correspond to at least one token of a plurality of tokens (802). In some examples, streaming module 22 may receive the plurality of command frames via a wired and/or wireless communication link between sink device 6 and the source device, such as communication channel 8 of FIGS. 1 and 2.

Reconstructing module 41 of streaming module 22 may reconstruct the plurality of tokens based on the plurality of command frames (804). For instance, reconstructing module 41 may reconstruct a particular token from a particular command frame by determining which graphical command of a set of graphical commands is indicated by the particular token. As one example, where a token ID included in the particular command frame includes an indication of command type and an offset value, reconstructing module 41 may determine which graphical command corresponds to the token ID included by determining an absolute token ID in accordance with one or more of equations (1)-(4), above. Using the absolute token ID, reconstructing module 41 may reference a look-up-table stored at sink device 6 (that may be identical to a look-up-table stored at the source device), to determine which graphical command corresponds to the token ID included in the particular command frame.

Streaming module 22 may render video data based on the plurality of tokens and one or more texture elements (806). For instance, streaming module 22 may output the plurality of tokens to a GPU of sink device 6, such as GPU 20. In this way, sink device 6 may render video based on command frames.

Figure 9:
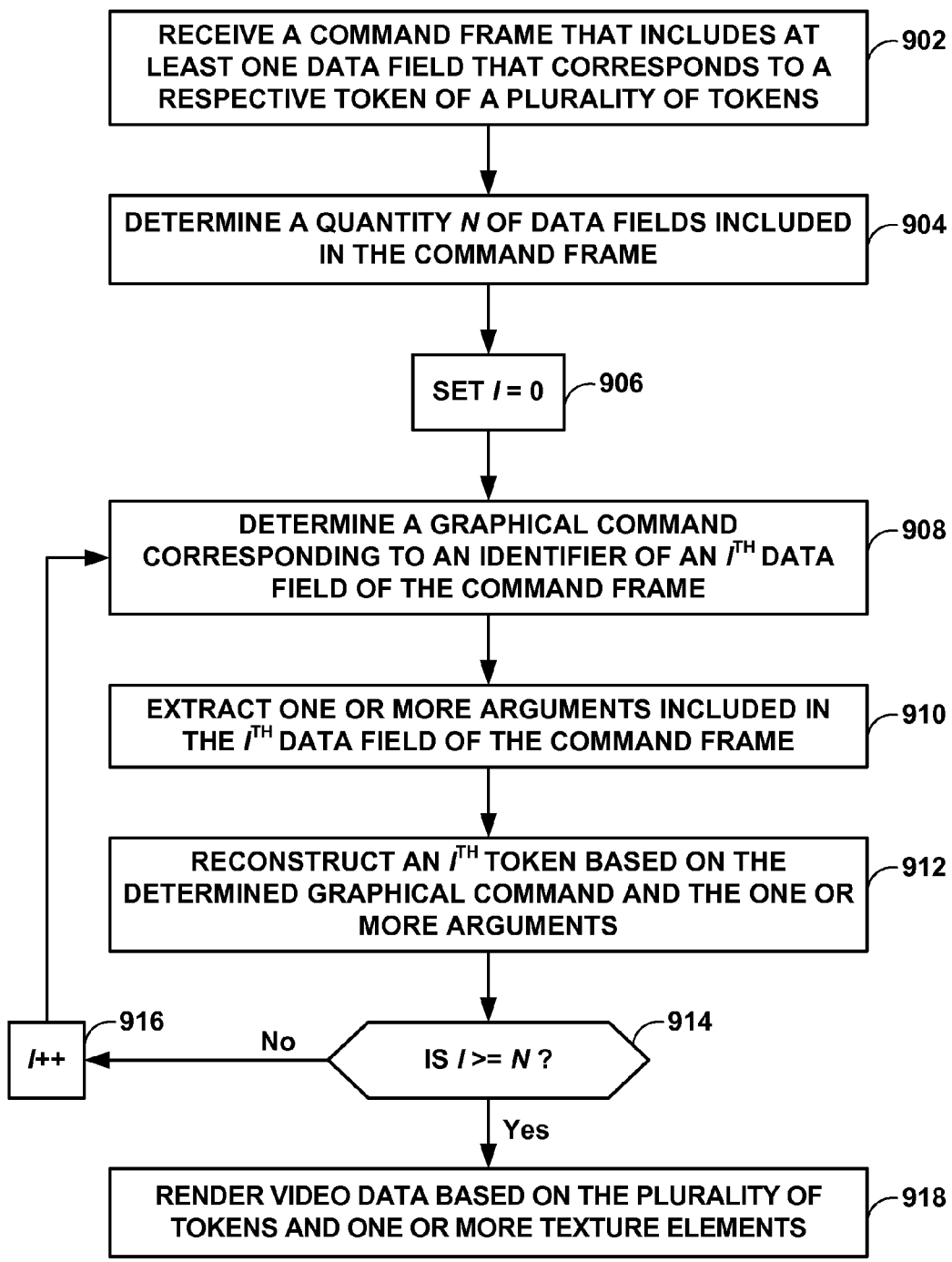
FIG. 9 is a flow diagram illustrating example operations of a sink device to receive video data streamed from a source device, in accordance with one or more techniques of the present disclosure.

FIG. 9 is a flow diagram illustrating example operations of a sink device to receive video data streamed from a source device, in accordance with one or more techniques of the present disclosure. The techniques of FIG. 9 may be performed by one or more processors of a computing device, such as sink device 6 illustrated in FIGS. 1 and 2. For purposes of illustration, the techniques of FIG. 9 are described within the context of sink device 6 illustrated in FIGS. 1 and 2, although computing devices having configurations different than that of sink device 6 may perform the techniques of FIG. 9.

In accordance with one or more techniques of this disclosure, streaming module 22 of sink device 6 may receive a current command frame of a plurality of command frames that each include at least one data field of one or more data fields that each respectively correspond to a respective token of a plurality of tokens (902). In some examples, streaming module 22 may receive the cu command frames via a wired and/or wireless communication link between sink device 6 and the source device, such as communication channel 8 of FIGS. 1 and 2.

Reconstructing module 41 of streaming module 22 may reconstruct the plurality of tokens based on the plurality of command frames. For instance, reconstructing module 41 may determine a quantity N of data fields included in the current command frame (904). In some examples, reconstructing module 41 may determine the quantity N based on a difference between a token sequence number of the current command frame and a token sequence number of a previous command frame.

Reconstructing module 41 may set an index value I to zero (906) and determine a graphical command corresponding to an identifier included in an $I^{th}$ data field of the current command frame (908). As discussed above, reconstructing module 41 may determine the graphical command corresponding to the identifier included in the J" data field of the current command frame by referencing LUT 64. Reconstructing module 41 may extract one or more arguments included in the $I^{th}$ data field of the current command frame (910). As discussed above, reconstructing module 41 may extract one or more arguments included in the $I^{th}$ data field based on respective argument lengths which may be obtained by referencing LUT 64. In any case, reconstructing module 41 may reconstruct an $I^{th}$ token based on the determined graphical command and the one or more arguments (912).

Reconstructing module 41 may determine whether the $I^{th}$ data field is the last data field included in the current command frame (i.e., whether I is greater than or equal to N) (914). If the $I^{th}$ data field is not the last data field included in the current command frame ("No" branch of 914), reconstructing module 41 may increment I (916), and determine a graphical command corresponding to an identifier included in the new $I^{th}$ data field of the current command frame (908). If the $I^{th}$ data field is the last data field included in the current command frame ("Yes" branch of 914), reconstructing module 41 may cause one or more components of sink device 6, such as GPU 20, to render video data based on the plurality of tokens reconstructed based on the plurality of command frames (918).

As discussed above, in some examples, source device 4 and/or sink device 6 may use a "wfd_gee_capability"

parameter to negotiate transmission of video data. In some examples, the "wfd_gee_capability" parameter may be defined as follows:

wfd_gee_capability="wfd_gee_capability:" SP ("none"/
   (tcp-port ";" udp-port ";" openGL-version ";" EGL-
   version)) CRLF; "none" if not supported
tcp-port="TCPport=" ("none"/IPPORT)
udp-port="UDPport=" ("none/IPPORT)
openGL-version="openGL-version=" (GL-major-version
   SP GL-minor-version)
GL-major-version=2*2HEXDIG
GL-minor-version=2*2HEXDIG
EGL-version="EGL-version=" (EGL-major-version SP
   EGL-minor-version)
EGL-Major-version=2*2HEXDIG
EGL-Minor-version=2*2HEXDIG The following examples may illustrate one or more aspects of the disclosure:

Example 1

A method for transmitting video data comprising: capturing, by a source device, a plurality of tokens of graphical commands renderable into video data along with one or more texture elements; generating, by the source device, a plurality of command frames that each correspond to at least one token of the plurality of tokens, wherein each respective command frame of the plurality of command frames includes: an identification of at least one graphical command corresponding to the at least one token; and one or more arguments associated with the at least one token; and outputting, by the source device and for transmission to a sink device, the plurality of command frames.

Example 2

The method of example 1, wherein generating a particular command frame of the plurality of command frames comprises: responsive to determining that at least one argument of the one or more arguments included in the particular command frame includes a pointer that references data, dereferencing the pointer such that the particular command frame includes the data, wherein the particular command frame further includes an indication of a length of the one or more arguments included in the particular command frame.

Example 3

The method of any combination of examples 1-2, wherein a particular command frame of the plurality of command frames further includes: at least one texture element of the one or more texture elements.

Example 4

The method of any combination of examples 1-3, wherein a particular command frame of the plurality of command frames corresponds to a particular token of the plurality of tokens, and wherein generating the particular command frame comprises generating an identification of the particular graphical command corresponding to the particular token by at least: encoding an indication of a command type of the particular graphical command; and encoding an offset value for the particular graphical command.

Example 5

The method of any combination of examples 1-4, further comprising: determining, by the source device, whether the sink device supports receiving video data in the form of command frames by at least generating, by the source device and for transmission to the sink device, a first real time streaming protocol (RTSP) message that includes a GET_PARAMETER request for the sink device to indicate whether the sink device supports receiving video in the form command frames; responsive to determining, by the source device, that the sink device supports receiving video data in the form of command frames, generating, by the source device and for transmission to the sink device, a second RTSP message that includes a SET_PARAMETER request that indicates one or more port address to which the sink device may output the plurality of command frames.

Example 6

The method of any combination of examples 1-5, wherein outputting the plurality of command frames comprises outputting, by the source device and for transmission to the sink device via a link, the plurality of command frames using a transmission control protocol (TCP) or a user datagram protocol (UDP).

Example 7

The method of any combination of examples 1-6, wherein the link is a wireless link, the method further comprising: responsive to determining that a quality metric of the wireless link does not satisfy a quality threshold, outputting, by the source device and for wireless transmission to the sink device via the wireless link, the plurality of command frames using the TCP; and responsive to determining that the quality metric of the wireless link satisfies the quality threshold, outputting, by the source device and for wireless transmission to the sink device via the wireless link, the plurality of command frames using the UDP.

Example 8

The method of any combination of examples 1-7, further comprising applying content protection to the plurality of command frames.

Example 9

A source device comprising: a memory; a communications unit; and one or more processors configured to: capture a plurality of tokens of graphical commands renderable into video data along with one or more texture elements; generate a plurality of command frames that each correspond to at least one token of the plurality of tokens, wherein each respective command frame of the plurality of command frames includes: an identification of at least one graphical command corresponding to the at least one token; and one or more arguments associated with the at least one token; and output, to the communications unit and for transmission to a sink device, the plurality of command frames.

Example 10

The source device of example 9, wherein the one or more processors are configured to perform the method of any combination of examples 1-8

Example 11

A source device comprising: means for capturing a plurality of tokens of graphical commands renderable into video data along with one or more texture elements; means for generating a plurality of command frames that each correspond to at least one token of the plurality of tokens, wherein each respective command frame of the plurality of command frames includes: an identification of at least one graphical command corresponding to the at least one token; and one or more arguments associated with the at least one token; and means for outputting, for transmission to a sink device, the plurality of command frames.

Example 12

The source device of example 11, further comprising means for performing any combination of the method of examples 1-8.

Example 13

A non-transitory computer-readable storage medium stores instructions that, when executed, cause one or more processors of a source device to: capture a plurality of tokens of graphical commands renderable into video data along with one or more texture elements; generate a plurality of command frames that each correspond to at least one token of the plurality of tokens, wherein each respective command frame of the plurality of command frames includes: an identification of at least one graphical command corresponding to the at least one token; and one or more arguments associated with the at least one token; and output, for transmission to a sink device, the plurality of command frames.

Example 14

The non-transitory computer-readable storage medium of example 13, further storing instructions that, when executed, cause the one or more processors of the source device to perform any combination of the method of examples 1-8.

Example 15

A method for receiving video data comprising: receiving, by a sink device and from a source device, a plurality of command frames that each correspond to at least one token of a plurality of tokens, wherein each respective command frame of the plurality of command frames includes: an identification of at least one graphical command corresponding to the at least one token; and one or more arguments associated with the at least one token; reconstructing, by the sink device, the plurality of tokens based on the plurality of command frames; and rendering, by the sink device, video data based on the plurality of tokens and one or more texture elements.

Example 16

The method of example 15, wherein reconstructing a particular token of the plurality of tokens comprises: determining a length of each respective argument of the one or more arguments associated with the at least one token; extracting, based on the determined lengths, each respective argument of the one or more arguments.

Example 17

The method of any combination of examples 15-16, wherein a particular command frame of the plurality of command frames further includes at least one texture element of the one or more texture elements.

Example 18

The method of any combination of examples 15-17, wherein: a particular command frame of the plurality of command frames corresponds to a particular token of the plurality of tokens, an identification of the particular graphical command corresponding to the particular token includes: an indication of a command type of the particular graphical command, and an offset value for the particular graphical command, and the method further comprises determining the particular graphical command based on the indication of the command type and the offset value for the particular graphical command.

Example 19

The method of any combination of examples 15-18, further comprising: receiving, by the sink device and from the source device, a first real time streaming protocol (RTSP) message that includes a GET_PARAMETER request for the sink device to indicate whether the sink device supports receiving video in the form command frames; and generating, by the sink device and for transmission to the source device, a second RTSP message that includes a GET_PARAMETER request that indicates that the sink device supports receiving video in the form command frames.

Example 20

The method of any combination of examples 15-19, wherein receiving the plurality of command frames comprises receiving, by the sink device and from the source device via a link, the plurality of command frames using a transmission control protocol (TCP) or a user datagram protocol (UDP).

Example 21

The method of any combination of examples 15-20, wherein the link is a wireless link, the method further comprising: where a quality metric of the wireless link does not satisfy a quality threshold, receiving, by the sink device and from the source device via the wireless link, the plurality of command frames using the TCP; and where the quality metric of the wireless link satisfies the quality threshold, receiving, by the sink device and from the source device via the wireless link, the plurality of command frames using the UDP.

Example 22

The method of any combination of examples 15-21, further comprising removing content protection to the plurality of command frames.

Example 23

A sink device comprising: a memory; a communications module; and one or more processors configured to: receive, from a source device and via the communications module, a plurality of command frames that each correspond to at least one token of a plurality of tokens, wherein each respective command frame of the plurality of command frames includes: an identification of at least one graphical command corresponding to the at least one token; and one or more arguments associated with the at least one token; reconstruct the plurality of tokens based on the plurality of command frames; and render video data based on the plurality of tokens and one or more texture elements.

Example 24

The sink device of example 23, wherein the one or more processors are further configured to perform the method of any combination of examples 15-21.

Example 25

A sink device comprising: means for receiving, from a source device, a plurality of command frames that each correspond to at least one token of a plurality of tokens, wherein each respective command frame of the plurality of command frames includes: an identification of at least one graphical command corresponding to the at least one token; and one or more arguments associated with the at least one token; means for reconstructing the plurality of tokens based on the plurality of command frames; and means for rendering video data based on the plurality of tokens and one or more texture elements.

Example 26

The sink device of example 25, further comprising means for performing any combination of the method of examples 15-21.

Example 27

A non-transitory computer-readable storage medium stores instructions that, when executed, cause one or more processors of a sink device to receive, from a source device, a plurality of command frames that each correspond to at least one token of a plurality of tokens, wherein each respective command frame of the plurality of command frames includes: an identification of at least one graphical command corresponding to the at least one token; and one or more arguments associated with the at least one token; reconstruct the plurality of tokens based on the plurality of command frames; and render video data based on the plurality of tokens and one or more texture elements.

Example 28

The non-transitory computer-readable storage medium of example 27, further storing instructions that, when executed, cause the one or more processors of the sink device to perform any combination of the method of examples 15-21.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for transmitting video data comprising:
   capturing, by a source device, a plurality of tokens of graphical commands renderable into video data;
   generating, by the source device and for each respective token of the plurality of tokens, a respective command frame of a plurality of command frames, wherein the generating comprises:
      determining, for respective tokens of the plurality of tokens and using a look-up table that provides a mapping between identifications of graphical commands and graphical commands, respective identifications of the graphical commands corresponding to the respective tokens; and
      encapsulating, by the source device, respective tokens of the plurality of tokens into respective command frames of the plurality of command frames, wherein each respective command frame of the plurality of command frames includes:
         the determined identification of the graphical command corresponding to the respective token encapsulated in the respective command frame; and
         one or more arguments associated with the respective token encapsulated in the respective command frame; and
   outputting, by the source device and for wireless transmission to a sink device, the plurality of command frames.

2. The method of claim 1, wherein encapsulating a particular token into a particular command frame of the plurality of command frames comprises:
   responsive to determining that at least one argument of the one or more arguments included in the particular command frame includes a pointer that references data, dereferencing the pointer such that the particular command frame includes the data,
   wherein the particular command frame further includes an indication of a length of the one or more arguments included in the particular command frame.

3. The method of claim 1, wherein a particular command frame of the plurality of command frames further includes:
   at least one texture element of the one or more texture elements.

4. The method of claim 1, wherein generating a particular command frame of the plurality of command frames for a particular token of the plurality of tokens comprises encoding the determined identification of the particular graphical command corresponding to the particular token by at least:
   determining, based on the look-up table, an indication of a command type of the particular graphical command;
   determining, based on the look-up table, an offset value for the particular graphical command; and
   encoding, in the particular command frame, the indication of the determined command type and the determined offset value for the particular graphical command.

5. The method of claim 1, further comprising:
   determining, by the source device, whether the sink device supports receiving video data in the form of command frames by at least generating, by the source device and for transmission to the sink device, a first real time streaming protocol (RTSP) message that includes a GET_PARAMETER request for the sink device to indicate whether the sink device supports receiving video in the form command frames;
   responsive to determining, by the source device, that the sink device supports receiving video data in the form of command frames, generating, by the source device and for transmission to the sink device, a second RTSP message that includes a SET_PARAMETER request that indicates one or more port address to which the sink device may output the plurality of command frames.

6. The method of claim 1, wherein outputting the plurality of command frames comprises outputting, by the source device and for transmission to the sink device via a link, the plurality of command frames using a transmission control protocol (TCP) or a user datagram protocol (UDP).

7. The method of claim 6, wherein the link is a wireless link, the method further comprising:
   responsive to determining that a quality metric of the wireless link does not satisfy a quality threshold, outputting, by the source device and for wireless transmission to the sink device via the wireless link, the plurality of command frames using the TCP; and
   responsive to determining that the quality metric of the wireless link satisfies the quality threshold, outputting, by the source device and for wireless transmission to the sink device via the wireless link, the plurality of command frames using the UDP.

8. The method of claim 1, further comprising applying content protection to the plurality of command frames.

9. A source device comprising:
   a memory configured to store a look-up table that provides mapping between identifications of graphical commands and graphical commands;
   a wireless communications unit; and
   one or more processors configured to:
      capture a plurality of tokens of graphical commands renderable into video data;
      generate, for each respective token of the plurality of tokens, a respective command frame of a plurality of command frames, wherein, to generate the command frames, the one or more processors are configured to:
         determine, for respective tokens of the plurality of tokens and using a look-up table that provides a mapping between identifications of graphical commands and graphical commands, respective identifications of the graphical commands corresponding to the respective tokens; and
         encapsulate respective tokens of the plurality of tokens into respective command frames of the plurality of command frames, wherein each respective command frame of the plurality of command frames includes:
            the determined identification of the graphical command corresponding to the respective token encapsulated in the respective command frame; and
            one or more arguments associated with the respective token encapsulated in the respective command frame; and
      output, to the communications unit and for transmission to a sink device, the plurality of command frames.

10. The source device of claim 9, wherein the one or more processors are configured to encapsulate a particular token into a particular command frame of the plurality of command frames by at least:
   responsive to determining that at least one argument of the one or more arguments included in the particular command frame includes a pointer that references data, dereferencing the pointer such that the particular command frame includes the data,
wherein the particular command frame further includes an indication of a length of the one or more arguments included in the particular command frame.

11. The source device of claim 9, wherein a particular command frame of the plurality of command frames further includes:
at least one texture element of the one or more texture elements.

12. The source device of claim 9, wherein:
to generate a particular command frame of the plurality of command frames for a particular token of the plurality of tokens the one or more processors are configured to encode the determined identification of the particular graphical command by at least:
determining, based on the look-up table, an indication of a command type of the particular graphical command;
determining, based on the look-up table, an offset value for the particular graphical command; and
encoding, in the particular command frame, the indication of the determined command type and the determined offset value for the particular graphical command.

13. The source device of claim 9, wherein the one or more processors are further configured to:
determine whether the sink device supports receiving video data in the form of command frames by at least generating, for transmission to the sink device, a first real time streaming protocol (RTSP) message that includes a GET_PARAMETER request for the sink device to indicate whether the sink device supports receiving video in the form command frames;
responsive to determining that the sink device supports receiving video data in the form of command frames, generate, for transmission to the sink device, a second RTSP message that includes a SET_PARAMETER request that indicates one or more port address to which the sink device may output the plurality of command frames.

14. The source device of claim 9, wherein the one or more processors are configured to output the plurality of command frames by at least outputting, for transmission to the sink device via a link, the plurality of command frames using a transmission control protocol (TCP) or a user datagram protocol (UDP).

15. A method for receiving video data comprising:
wirelessly receiving, by a sink device and from a source device, a plurality of command frames that each encapsulate a token of a plurality of tokens, wherein each respective command frame of the plurality of command frames includes:
an identification of a graphical command corresponding to a respective token of the plurality of tokens encapsulated in the respective command frame; and
one or more arguments associated with the respective token encapsulated in the respective command frame;
reconstructing, by the sink device, the plurality of tokens based on the plurality of command frames by at least:
identifying, for each respective command frame and using on a look-up table that provides a mapping between identifications of graphical commands and graphical commands, the graphical command corresponding to the respective token encapsulated in the respective command frame; and
rendering, by the sink device, video data based on the plurality of tokens and one or more texture elements.

16. The method of claim 15, wherein reconstructing a particular token of the plurality of tokens comprises:
determining, using on the look-up table, a length of each respective argument of the one or more arguments associated with the at least one token; and
extracting, based on the determined lengths, each respective argument of the one or more arguments.

17. The method of claim 15, wherein a particular command frame of the plurality of command frames further includes at least one texture element of the one or more texture elements.

18. The method of claim 15, wherein:
a particular command frame of the plurality of command frames encapsulates a particular token of the plurality of tokens,
an identification of the particular graphical command corresponding to the particular token includes: an indication of a command type of the particular graphical command, and an offset value for the particular graphical command, and
the method further comprises identifying, using the look-up table, the particular graphical command based on the indication of the command type, and the offset value for the particular graphical command.

19. The method of claim 15, further comprising:
receiving, by the sink device and from the source device, a first real time streaming protocol (RTSP) message that includes a GET_PARAMETER request for the sink device to indicate whether the sink device supports receiving video in the form command frames; and
generating, by the sink device and for transmission to the source device, a second RTSP message that includes a GET_PARAMETER request that indicates that the sink device supports receiving video in the form command frames.

20. The method of claim 15, wherein receiving the plurality of command frames comprises receiving, by the sink device and from the source device via a link, the plurality of command frames using a transmission control protocol (TCP) or a user datagram protocol (UDP).

21. The method of claim 20, wherein the link is a wireless link, the method further comprising:
where a quality metric of the wireless link does not satisfy a quality threshold, receiving, by the sink device and from the source device via the wireless link, the plurality of command frames using the TCP; and
where the quality metric of the wireless link satisfies the quality threshold, receiving, by the sink device and from the source device via the wireless link, the plurality of command frames using the UDP.

22. The method of claim 15, further comprising removing content protection to the plurality of command frames.

23. A sink device comprising:
a memory configured to store a look-up table that provides a mapping between identifications of graphical commands and graphical commands;
a wireless communications module; and
one or more processors configured to:
receive, from a source device and via the communications module, a plurality of command frames that each encapsulate a token of a plurality of tokens, wherein each respective command frame of the plurality of command frames includes:

an identification of a graphical command corresponding to a respective token of the plurality of tokens encapsulated in the respective command frame; and
one or more arguments associated with the respective token encapsulated in the respective command frame;
reconstruct the plurality of tokens based on the plurality of command frames, wherein, to reconstruct the plurality of tokens, the one or more processors are configured to:
identify, for each respective command frame and using on the look-up table, the graphical command corresponding to the respective token encapsulated in the respective command frame; and
render video data based on the plurality of tokens and one or more texture elements.

24. The sink device of claim 23, wherein the one or more processors are configured to reconstruct a particular token of the plurality of tokens by at least:
determining, using on the look-up table, a length of each respective argument of the one or more arguments associated with the at least one token; and
extracting, based on the determined lengths, each respective argument of the one or more arguments.

25. The sink device of claim 23, wherein a particular command frame of the plurality of command frames further includes at least one texture element of the one or more texture elements.

26. The sink device of claim 23, wherein:
a particular command frame of the plurality of command frames encapsulates a particular token of the plurality of tokens,
an identification of the particular graphical command corresponding to the particular token includes: an indication of a command type of the particular graphical command, and an offset value for the particular graphical command, and
the one or more processors are further configured to use the look-up table to identify the particular graphical command based on the indication of the command type and the offset value for the particular graphical command.

27. The sink device of claim 23, wherein the one or more processors are further configured to:
receive, from the source device, a first real time streaming protocol (RTSP) message that includes a GET_PARAMETER request for the sink device to indicate whether the sink device supports receiving video in the form command frames; and
generate, for transmission to the source device, a second RTSP message that includes a GET_PARAMETER request that indicates that the sink device supports receiving video in the form command frames.

28. The sink device of claim 23, wherein the one or more processors are configured to receive the plurality of command frames by at least receiving, from the source device via a wireless link, the plurality of command frames using a transmission control protocol (TCP) or a user datagram protocol (UDP).

29. The sink device of claim 28, wherein:
where a quality metric of the wireless link does not satisfy a quality threshold, the one or more processors are configured to receive, from the source device via the wireless link, the plurality of command frames using the TCP; and
where the quality metric of the wireless link satisfies the quality threshold, the one or more processors are configured to receive, from the source device via the wireless link, the plurality of command frames using the UDP.

30. The sink device of claim 23, wherein the one or more processors are further configured to remove content protection to the plurality of command frames.

* * * * *